United States Patent [19]
Visser et al.

[11] Patent Number: 5,587,245
[45] Date of Patent: Dec. 24, 1996

[54] FUSING MEMBER HAVING ZINC OXIDE-FILLED, ADDITION CURED LAYER

[75] Inventors: Susan A. Visser; Charles E. Hewitt; Tonya D. Binga, all of Rochester; Wayne T. Ferrar, Fairport; Michael W. Fichtner, Rochester; John J. Fitzgerald, Clifton Park, all of N.Y.

[73] Assignee: Eastman Kodak Company, Rochester, N.Y.

[21] Appl. No.: 363,149

[22] Filed: Dec. 23, 1994

[51] Int. Cl.$^6$ .................................................. B32B 25/20
[52] U.S. Cl. ..................... 428/447; 428/36.91; 428/448; 428/450; 492/53; 492/56
[58] Field of Search .......................... 428/36.9, 36.91, 428/36.92, 447, 450, 448; 492/53, 56

[56] References Cited

U.S. PATENT DOCUMENTS

| | | | |
|---|---|---|---|
| 4,074,001 | 2/1978 | Imai et al. | 428/329 |
| 4,360,566 | 11/1982 | Shimizu et al. | 428/404 |
| 4,373,239 | 2/1983 | Henry et al. | 429/53 |
| 4,375,505 | 3/1983 | Newkirk | 430/99 |
| 4,430,406 | 2/1984 | Newkirk et al. | 430/99 |
| 4,454,262 | 6/1984 | Fukayama et al. | 523/210 |
| 4,501,482 | 2/1985 | Stryjewski | 355/290 |
| 4,518,655 | 5/1985 | Henry et al. | 428/329 |
| 4,807,341 | 2/1989 | Nielsen et al. | 492/56 |
| 4,853,737 | 8/1989 | Hartley et al. | 355/289 |
| 4,970,098 | 11/1990 | Ayala-Esquilin et al. | 428/36.4 |
| 5,269,740 | 12/1993 | Fitzgerald et al. | 492/56 |
| 5,292,562 | 3/1994 | Fitzgerald et al. | 428/35.8 |
| 5,292,606 | 3/1994 | Fitzgerald | 428/35.8 |
| 5,336,539 | 8/1994 | Fitzgerald | 428/36.8 |

OTHER PUBLICATIONS

John Fitzgerald et al, "The Effect of Cyclic Stress on the Physical Properties of a Poly(dimethylsiloxane) Elastomer", *Polymer Engineering and Science*, vol. 32, No. 18 (Sep. 1992), pp. 1350–1357.

*Primary Examiner*—D. S. Nakarani
*Attorney, Agent, or Firm*—Robert Luke Walker; Anne B. Kiernan

[57] ABSTRACT

A fuser member having a core and a layer overlying the core. The layer includes: an addition crosslinked polyorganosiloxane elastomer, and zinc oxide particles dispersed therein in a concentration of from 5 to 40 percent of the total volume of the layer.

23 Claims, 17 Drawing Sheets

FUSING MEMBER HAVING ZINC OXIDE-FILLED, ADDITION CURED LAYER

FIELD OF THE INVENTION

This invention relates to a fuser roll useful for heat-fixing a heat-softenable toner material to a substrate. More particularly, the invention relates to a fuser roll having improved stability under conditions of elevated temperature and cyclic stress.

BACKGROUND

Heat-softenable toners are widely used in imaging methods such as electrostatography, where electrically charged toner is deposited imagewise on a dielectric or photoconductive element bearing an electrostatic latent image. Generally in such methods, the toner is then transferred to a surface of another substrate, such as a receiver sheet of paper or a transparent film, where it is then fixed in place to yield the desired final toner image. Heat and pressure, in combination are commonly utilized to fix or fuse the toner to the receiver. The heat and pressure are often applied by a pair of opposed members, such as a pair of rollers. As the toner bearing receiver passes between through the nip between the rollers; one of them, usually referred to as a "fuser roll" is heated and contacts the toner-bearing surface of the receiver sheet. The other roller, usually referred to as a pressure roll, presses the receiver sheet against the fuser roll.

The fuser roll usually comprises a rigid core covered with a resilient material, which will be referred to herein as a "base cushion layer." The resilient base cushion layer and the amount of pressure exerted by the pressure roll serve to establish the area of contact of the fuser roll with the toner-bearing surface of the receiver sheet as it passes through the nip of the pair of rolls. The size of this area of contact helps to establish the length of time that any given portion of the toner image will be in contact with and heated by the fuser roll. The degree of hardness (often referred to as "storage modulus") and stability thereof, of the base cushion layer are important factors in establishing and maintaining the desired area of contact.

Pressure and fuser rolls can have a regular cylindrical shape; however, an advantage is provided in some applications if the rolls are shaped to provide a gradient in pressure along a direction parallel to the axes of the rolls. This can be accomplished by, for example, continuously varying the overall diameter of one of the rolls along the direction of its axis such that the diameter is smallest at the midpoint of the axis and largest at the ends of the axis, in order to give the roll a "bow tie" or "hourglass" shape. The resulting pair of rolls will exert more pressure on the receiver sheet near the ends of the rolls than in the middle. Since a heated roll is generally more subject to permanent deformation on use than is an unheated roll, hourglass shaped, unheated pressure rolls are commonly used with cylindrical, heated fuser rolls. This provides a longer useful life for the more complexly shaped component, but does not address the problem of deformation of the fuser roll. As it is used, the fuser roll permanently deforms to the shape of the pressure roll. This degrades and eventually eliminates the pressure gradient.

In the past, it had been thought that various materials' suitability for use in fuser roll base cushion layers in terms of their stability during use—i.e., their ability to resist degradation (as evidenced by weight loss), creep (permanent deformation), and changes in hardness, during use in fuser rolls—could be determined by subjecting samples of the materials to conditions of continuous high temperature and continuous high stress (i.e., pressure), and then measuring the resultant changes in weight, shape (e.g., length), and hardness (e.g., storage modulus). This has since been disproven. Static testing is not a very good predictor of the stability that materials will exhibit during actual use in fuser roll base cushion layers. It has been found that testing based upon the application of cyclic stress is a better predictor of behavior of materials during actual use.

Fuser roll materials can be conveniently tested under conditions of cylic stress using a Mechanical Energy Resolver (also referred to herein as an "MER"). This device applies heat continuously to maintain the samples at a constant elevated temperature. The device also applies stress to the samples in the form of a compressive force, but does so in a manner such that the amount of compressive force applied varies cyclicly (i.e., sinusoidally). The results of such testing consistently correlate with, and therefore reliably predict, the degree of stability a material will exhibit in the base cushion layer of a fuser roll during actual use.

Another consideration for fuser rolls is the materials that will contact the rolls during use. In a typical electrophotographic process fusing subsystem there are multiple sets of rollers. In order to prevent toner build-up on the rollers, image degradation, hot offset, and toner contamination problems which may decrease fuser roller life, release oil is often applied to the fusing roller. The release oil is typically poly(dimethyl)siloxane oil (also referred to herein as "PDMS oil"), which is selected for its ability to withstand the almost continuous high temperatures (~200° C.) of the electrophotographic fusing process. While PDMS oil does an excellent job in its role as release agent, its compatibility with PDMS-based roller materials results in swelling of the rollers. This swelling cannot be easily compensated for, since it is generally non-uniform. Paper passing over the rollers can wick away some of the release oil within the paper path, resulting in a differential availability of the release oil to roller areas within and outside the paper path. This causes differential swell of the roller inside and outside the paper path so that a "step pattern" is formed in the roll. This can cause problems when different size papers are used and can lead to increased wear and decreased roller life.

One type of material that has been widely employed in the past to form a resilient base cushion layer for fuser rolls is condensation-crosslinked poly(dimethylsiloxane) (also referred to herein as "PDMS") elastomer. The prior art has also taught or suggested that various fillers comprising inorganic particulate materials can be included in such PDMS base cushion layers to improve their mechanical strength and/or thermal conductivity. Higher thermal conductivity is advantageous when the fuser roll is heated by an internal heater, so that the heat can be efficiently and quickly transmitted toward the outer surface of the fuser roll and toward the toner on the receiver sheet it is intended to contact and fuse. Higher thermal conductivity is not so important when the roll is intended to be heated by an external heat source. Disclosure of such filled condensation-cured PDMS elastomers for fuser rolls can be found, for example, in U.S. Pat. Nos. 4,373,239; 4,430,406; and 4,518,655.

One specific example of a condensation-crosslinked PDMS elastomer, which contains about 32–37 volume percent aluminum oxide filler and about 2–6 volume percent iron oxide filler, and which has been widely used and taught to be useful in fuser rolls, is sold under the trade name, EC4952, by the Emerson Cummings Co., U.S.A. However, it has been found that fuser rolls containing EC4952 cushion layers exhibit serious stability problems over time of use, i.e., significant degradation, creep, and changes in hardness, that greatly reduce their useful life. MER test results correlate with and predict the instability exhibited during actual use. Nevertheless, materials such as EC4952 initially provide very suitable resilience, hardness, and thermal conductivity for fuser roll cushion layers.

Some condensation-crosslinked PDMS elastomers that show less change in hardness and creep than EC4952 or aluminum oxide-filled PDMS are disclosed in U.S. patent application Ser. No. 08/167,584 (tin oxide filler), U.S. Pat. Nos. 5,292,606 (zinc oxide filler), 5,269,740 (copper oxide filler), 5,292,562 (chromium oxide filler), and 5,336,539 (nickel oxide filler).

U.S. patent application Ser. No. 08/306,066 discloses a tin oxide-filled, addition cured polysiloxane system containing 0 to <20 mol% diphenyl units and the remainder dimethyl units. U.S. patent application Ser. No. 08/268,136 teaches a zinc oxide-filled, condensation cured polydimethyl diphenyl siloxane system containing 20–40 wt% zinc oxide and <20 mol% polydiphenylsiloxane.

U.S. Pat. No. 4,970,098 by J. Ayala-Esquilin, W. H. Dickstein, J. L. Hedrick, Jr., J. C. Scott, and A. C. Yang discloses a diphenyl-dimethylsiloxane elastomer filled with 40–55 wt% zinc oxide of 100–500 nm particle size, 5–10 wt% graphite of <10 μm particle size, and 1–5 wt% ceric dioxide of 0.2–3 μm particle size. The diphenyl content was 20–50 wt% (equivalent to 8.5,to 27 mol%).

U.S. Pat. No. 4,807,341 by P. A. Nielsen and J. A. Pavlisko discloses a diphenyl-dimethylsiloxane elastomer containing 5–15 mol% diphenylsiloxane and 0–5% vinyl-addition crosslinked siloxane units. Aluminum oxide and iron oxide fillers were disclosed.

U.S. Pat. No. 4,074,001 describes fixing rollers for electrophotography which may comprise phenyl-substituted diorganopolysiloxanes filled with calcium carbonate (<10 μm particle size), iron oxide (<10 μm particle size), and titanium dioxide (<10 μm particle size).

U.S. Pat. No. 4,360,566 describes heat fixing rollers for electrophotography that may comprise addition-crosslinked diphenyl-substituted polyorganosiloxanes, filled with substantial amounts (50–250 parts by weight) of siliceous filler.

U.S. Pat. No. 4,454,262 describes silicone rubbers that may contain phenyl radicals and that contain spindle-shaped calcium carbonate filler.

The above references have a variety of shortcomings. Most do not address the issue of improved stability under cyclic stress at elevated temperature optionally accompanied by reduced oil swell. Some of the references call for fillers that a costly.

It would therefore be very desirable to be able to provide a fuser roll with a layer comprising a addition-crosslinked PDMS elastomer containing zinc-oxide filler, wherein the layer material exhibits good stability under conditions of elevated temperature and cyclic stress, i.e., good resistance to degradative weight loss, creep, and changes in hardness, and optionally good resistance to PDMS oil.

SUMMARY OF THE INVENTION

The present invention relates to a fuser roll comprising a zinc oxide-filled, addition-cured polysiloxane elastomer that exhibits good stability under conditions of elevated temperature and cyclic stress, i.e., good resistance to degradative weight loss, creep, and changes in hardness. Embodiments of the invention also exhibit increased resistance to swell with PDMS oil compared to polydimethylsiloxane elastomers.

The invention provides a fuser member having a core and a layer overlying the core. The layer includes: an addition crosslinked polyorganosiloxane elastomer, and zinc oxide particles dispersed therein in a concentration of from 5 to 40 percent of the total volume of the layer.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

Figure 1A:
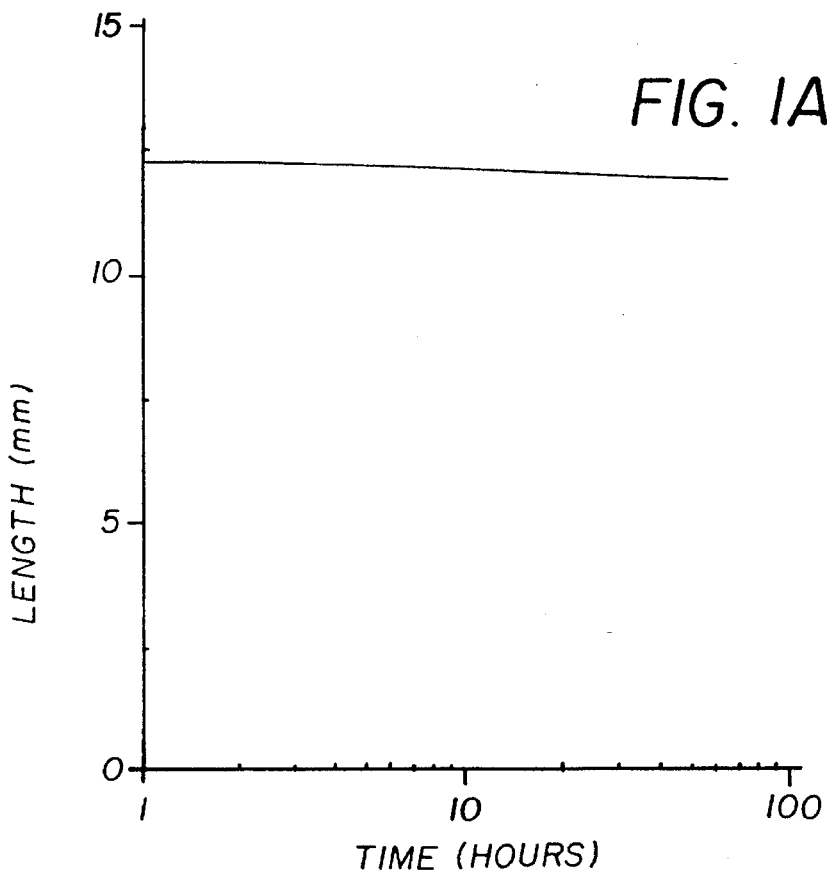
FIG. 1 is a graph of fractional length and storage modulus vs. time for the material of Example 1.

The invention is directed to fuser rolls and, more generally, to what are referred to herein as fuser members. The term "fuser member" is used herein to refer to components of a electrophotographic fusing system that engage a toner carrying receiver and fuse the toner by means of elevated temperature and pressure. Examples of such components include fuser rollers, pressure rollers, fuser platens, and fuser belts. The term fuser member is also used herein to refer to similar components, subject to similar conditions used in non-electrophotographic equipment.

The fuser member of the invention has a core and one or more layers of elastomer. At least one of the layers (referred to herein as the "A-layer") is addition cured polysiloxane having from about 5 to about 40 volume percent zinc oxide particles as filler. The characteristics of the addition cured, zinc oxide filled polysiloxane are discussed below in detail.

Fuser members in accordance with the invention can have the A-layer as the only elastomer layer or can have the A-layer as a base cushion with one or more other layers over the base cushion layer, or can have the A-layer as a top coat or intermediate layer in combination with one or more additional layers. Depending upon the configuration chosen, this can allow one to not be concerned with the wear-resistance and toner-release properties of the base cushion layer. Properties such as abrasion-resistance and the ability to fuse toner without having some of the toner adhere to the fuser member and be pulled away from the receiver sheet as it exits the nip of the rolls, can be provided by such other layer or layers over the base cushion layer, as is well known in the art. A variety of suitable materials for various fuser member layers are well known to those skilled in the art.

In uses that would place the A-layer in contact with poly(dimethyl siloxane) release oil, it is desirable to either protect the A-layer by a barrier layer or the like, or to use an embodiment of the invention in which the A-layer is resistant to release oil induced deformation. Materials for the other layer or layers over the base cushion layer can be chosen to provide a barrier that prevents such release oil from coming into contact with the base cushion layer, as is also well known in the art. In an appropriate embodiment of the invention, the A-layer can be a barrier layer for a base cushion of another material or base cushion A-layer that is not oil resistant or is less oil resistant.

For description of other layers and materials therefor that can be usefully provided over fuser member base cushion layers, see, for example, U.S. Pat. Nos. 4,375,505; 4,430, 406; 4,501,482; and 4,853,737. In some specific embodiments of the present invention, the base cushion layer has one other layer thereover, which is an oil-barrier layer comprising poly(vinylidene fluoride-co-hexafluoropropylene), a material commercially available, for example, from DuPont, U.S.A., under the trademark, Viton A. In some other specific embodiments, there are two layers over the base cushion layer, e.g., an oil-barrier layer and, thereover, an outermost layer that provides good wear-resistance and toner-release properties, comprising, for example, a vinyl-addition-crosslinked siloxane having silica and titania fillers dispersed therein, such as is commercially available from Dow-Corning, U.S.A., under the trademark, Silastic E.

Usually, layers overlying a base cushion layer are flexible but thinner than the base cushion layer, so that the base cushion layer can provide the desired resilience to the fuser member, and the other layers can flex to conform to that resilience without having to be resilient themselves. The thickness of the base cushion layer and other layers will be chosen with consideration of the requirements of the particular application intended. For example, base cushion layer thicknesses in the range from 0.6 to 5.0 mm have been found to be appropriate for various applications. In some embodiments of the present invention, the base cushion layer is about 2.5 mm thick, and any oil-barrier and/or wear-resistant toner-release layers thereover are each about 25 to 30 micrometers thick.

The core of the fuser member is usually cylindrical in shape. It comprises any rigid metal or plastic substance. Metals are preferred when the fuser member is to be internally heated, because of their generally higher thermal conductivity. Suitable core materials include, for example, aluminum, steel, various alloys, and polymeric materials such as thermoset resins, with or without fiber reinforcement.

The addition-crosslinked siloxane elastomer in the base cushion layer of fuser rolls provided by the invention can be formed by addition reaction of vinyl substituted multifunctional siloxane polymers with multifunctional organo-hydrosiloxanes. Vinyl substituted multifunctional siloxane polymers and their preparation are well known to those skilled in the art. The vinyl substituted multifunctional siloxane polymers have the following repeating subunits:

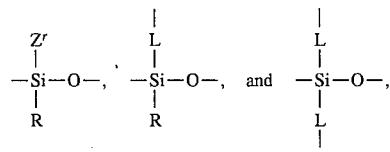

and terminal subunits having the general structure:

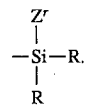

Designations, such as $Z^r$, R, and L, in all structural formulas herein; are used in a uniform manner and have the following meanings.

R is alkyl having from 1 to 8 carbons, or aryl having a solitary ring and from 6 to 14 carbons including carbons of any ring substituents. Less than 25 percent of the R groups are aryl. Specific examples of R groups include: methyl, ethyl, propyl, butyl, and phenyl. R groups can be substituted, however, substituents should not degrade the characteristics of the resulting elastomer. For example, R groups that react with olefins or organo-hydrosiloxanes are highly undesirable. A specific example of R substitution of a siloxane polymer is: R=about 3 to 16 percent phenyl and about 97 to 84 percent methyl. Another specific example is a siloxane polymer having 3 to 16 percent diphenyl silyl and the remainder dimethyl silyl.

Z is an olefinic group having from 2 to 8 carbons and a terminal vinyl moiety. Specific examples of Z groups include: vinyl and allyl.

$Z^r$ represents Z or R, subject to the limitation that each molecule of vinyl substituted multifunctional siloxane polymer has two or more Z moieties (and thus 2 or more terminal vinyl groups).

L is $-O-$ or $-(CH_2)_e-$, where e is an integer from 1 to about 8.

The vinyl substituted multifunctional siloxane polymers can be represented, at least in so far as the currently preferred embodiments of the invention, by the general structure (referred to herein as "structure I"):

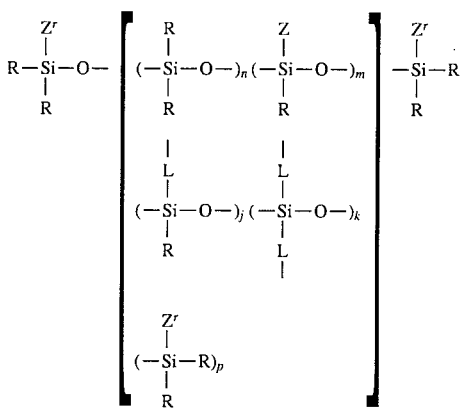

Each repeating subunit that has one or more L moieties (also referred to herein as branching subunits) represents a branch point. Branches may extend outward in the form of a dendrite or star, or may form crosslinks to other chains. The value of p, the number of terminal units on branches, is equal to of less than the total number of branching units, j+2k, and may be as low as zero if all branching subunits form crosslinks.

The extent of branching or crosslinking of the siloxane polymer is low, since the resulting elastomer would otherwise be excessively hard. If n+m+j+k is defined as being equal to 100 mole percent; then j+k is less than 5 mole percent, and preferably is from 2 mole percent to 0 mole percent. The latter represents a preferred siloxane polymer, in which branching subunits are completely or substantially excluded. For this polymer, structure I can be simplified to the following (structure II):

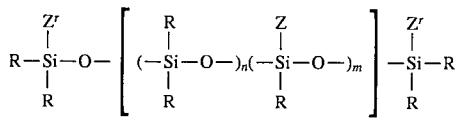

The siloxane polymer has at least two olefinic functionalities (in structures I or II; Z, or $Z^r$, or a combination of Z and Zr). The percentage of silicon atoms substituted by an olefinic moiety can be higher than two, but must be low enough to prevent the resulting elastomer from being excessively hard due to extensive crosslinking. It is preferred that the percentage of silicon atoms substituted by an olefinic moiety is less than 3 percent of the total number of silicon atoms; or, more preferably, less than 2 percent of the total number of silicon atoms.

In particular embodiments of the invention, the value of m is 0 or 1 and $Z^r$ is olefinic. In one such embodiment, structure II can be simplified as (structure III):

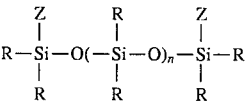

In some other embodiments of the invention, $Z^r$ is R. In one such embodiment, structure II can be simplified as (structure IV):

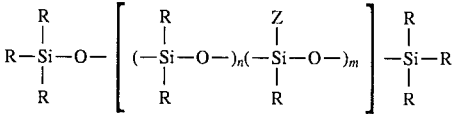

In particular embodiments of the invention, Z or $Z^r$ groups each have the general structure

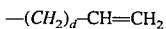

where d is an integer from 0 to about 6 and preferably from 0 to 3. In one such embodiment, the siloxane polymer has the general structure (structure V):

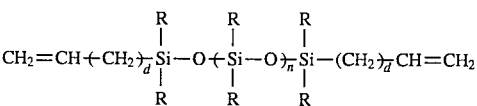

A specific example of such a siloxane polymer is vinyldimethyl terminated polydimethylsiloxane, which has the general structure:

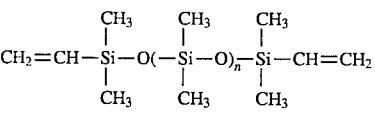

Another example is a vinyldimethyl terminated dimethyldiphenyl copolymer, which has the general structure:

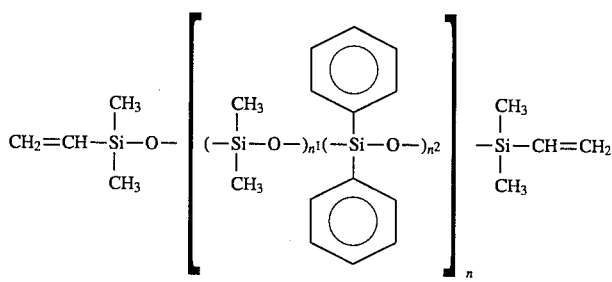

where $n^1+n^2=n$ and $n^1/n^2$ is greater than 3/1. Both of these materials are commercially available from United Chemical Technologies, Inc., Piscataway, N.J., under various designations depending upon the viscosity (and values of n or $n^1$, $n^2$, and n).

In another such embodiment, the siloxane polymer has the general structure (structure VI):

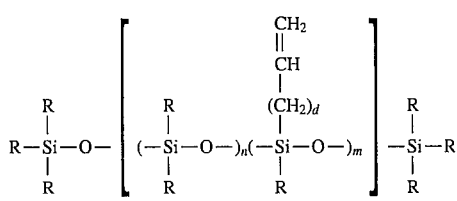

The designations n, m, and d have the same meanings as given above. A specific example of such a siloxane polymer is vinylmethyl siloxane copolymers in which each R is methyl.

In the structural formulas above, the values of n, or n+m, or n+m+j+k, are integers such that the respective polymer has a weight average molecular weight between vinyl groups of from 7,000 to 100,000. If the molecular weight between vinyl groups was above 100,000, the final crosslinked polymer would be too unstable under conditions of high temperature and cyclic stress (i.e., there would be too much creep and change in hardness over time), even when filler is dispersed therein in accordance with the invention. If the molecular weight between vinyl groups was below 7,000, the final crosslinked elastomer would have a high crosslink density that would make the material too hard and brittle, and not resilient enough to serve practically in a base cushion layer. (For the siloxane polymers of structure I, a standard for "excessive hardness" is established by final crosslinked elastomer prepared using siloxane polymer having a molecular weight between vinyl groups below 7,000. Any final crosslinked elastomer having a similar or greater hardness is excessively hard.)

The multifunctional organo-hydrosiloxanes that can serve as crosslinking agents for the structure I polymers have the general structure:

  (VII)

Each T represents:

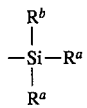

or both T's together represent atoms completing an organo-hydrosiloxane ring, such that structure VII can be rewritten:

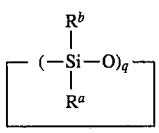

$R^a$ represents the same groups as R: alkyl having from 1 to 8 carbons, or aryl having a solitary ring and from 6 to 14 carbons including carbons of any ring substituents. Specific examples of $R^a$ groups include: methyl, ethyl, butyl, and phenyl. $R^b$ represents H or $R^a$. At least two $R^b$ moieties are H. It is currently preferred that $R^a$ be methyl. It is currently preferred that T be trimethylsilyl. The value of q is from 3 to about 300. A specific example of a suitable multifunctional organo-hydrosiloxane is a material marketed as PS123, by United Chemical Technologies, Piscataway, N.J.

This material has the general structure:

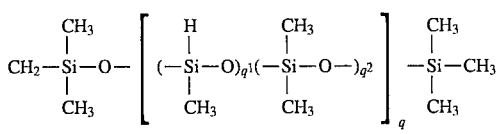

where $q^1+q^2=q$, and a molecular weight of about 2,000–2,500. Another example is 1,3,5,7-tetramethylcyclotetrasiloxane, which is also available from United Chemical Technologies.

The addition crosslinking reaction is carried out with the aid of a late transition metal catalyst, such as cobalt, rhodium, nickel, palladium or platinum catalysts. Specific examples of such catalysts include chlorotris(triphenylphosphine) rhodium(I), $RhCl(Ph_3P)_3$; dicobaltoctacarbonyl, $Co_2(CO)_8$; and chloroplatinic acid, $H_2PtCl_6$. Chloroplatinic acid is currently preferred. In a particular embodiment of the invention, the catalyst is added as a complex with vinyl-terminated polysiloxane. Currently preferred is a catalyst complex sold commercially as PC075 by United Chemical Technologies. This material is a complex of chloroplatinic acid and cyclovinylmethyl siloxane and has a platinum concentration of 2 to 3.5 percent. It is also currently preferred that the PC075 complex be diluted with vinyl-terminated dimethylsiloxane polymer to provide a final platinum concentration of from 0.3–1.2 parts per million, depending upon the desired cure rate. A suitable polysiloxane diluent is marketed by United Chemical Technologies as PS441.2 (viscosity=200).

The zinc oxide particles employed as filler in the base cushion layer of a fuser member of the invention can be obtained from any convenient commercial source, for example, Zinc Corporation of America, Monaca, Pa., U.S.A. The particle size does not appear to be critical. Particle sizes anywhere in the range of 0.1 to 100 micrometers have been found to be acceptable. In the examples presented below the zinc oxide particles were from 1 to 40 micrometers in diameter.

The zinc oxide filler particles are mixed with the structure (I) polymer and multifunctional organo-hydrosiloxane crosslinker prior to curing the mix on the fuser member core to form the base cushion layer. The zinc oxide particles comprise from about 5 to 40 percent, preferably 10 to 40 percent and more preferably from 20 to 40 percent of the total volume of the base cushion layer. Concentrations less than 20 volume percent provide lesser degrees of stability. Concentrations greater than 40 volume percent will render the layer too hard to provide the desired area of contact with the toner-bearing receiver sheet.

In cases where it is intended that the fuser member be heated by an internal heater, it is desirable that the base cushion layer have a relatively high thermal conductivity, so that the heat can be efficiently and quickly transmitted toward the outer surface of the fuser member that will contact the toner intended to be fused. Zinc oxide filler particles increase the thermal conductivity of an addition-crosslinked siloxane base cushion layer. When zinc oxide particles are dispersed in the base cushion layer at a concentration of from 30 to 40 percent of the total volume of the layer, the thermal conductivity of the layer is at least as high as prior art base cushion layer formulations, such as the previously mentioned EC4952.

To form the base cushion layer of a fuser member in accordance with the invention, the structure I polymer, a slight excess of the stoichiometric amount of multifunctional silane to form crosslinks with all the vinyl groups of the structure I polymer, and the appropriate amount of zinc oxide filler are thoroughly mixed on a three-roll mill or using another mixing method known to those skilled in the art. The catalyst is then added to the mix with thorough stirring. The mix is then degassed and injected into a mold surrounding the fuser member core to mold the material onto the core. The covered core remains in the mold for a time sufficient for some crosslinking to occur (e.g., 18 hours at room temperature or a shorter time at elevated temperature). The covered roll is then removed from the mold and heated to accelerate the remaining crosslinking. The other layer or layers are then coated thereover by any appropriate method.

The following examples are presented to further illustrate some specific materials in accordance with the invention and to compare their properties with materials not within the scope of the invention. The zinc oxide used was designated XX503R from Zinc Corporation of America and had a volume mean particle size of 11 μm and a particle size range of 2–40 μm. The aluminum oxide used was T64 tabular alumina, obtained from Whittaker, Clark, and Daniels, Inc. Other materials used are specified in the Examples.

EXAMPLE 1: 3% diphenyl, 35% zinc oxide

Sample slabs of zinc-filled, addition-crosslinked siloxane elastomer were prepared by mixing siloxane, crosslinking agent, and filler on a three-roll mill. Catalyst was then stirred into the mixture. The mixture was degassed and injected into the mold, where it was incubated for 1 hour at 75° C. The slab (5 in.×5 in.×0.075 in.) was removed from the mold and further incubated by ramping to 205° C. over the course of 2 hours and holding at 205° C. for an additional 8 hours.

The siloxane was a vinyl terminated poly(diphenyl-dimethyl)siloxane marketed by United Chemical Technologies, Inc., Piscataway, N.J., as PS732. PS732 is 3 mole percent diphenyl and 97 mole percent dimethyl. This material is described by United Chemical Technologies, Inc. as having a molecular weight of 15,600 and a nominal viscosity of 500. (Molecular weights and viscosities for products of United Chemical Technologies, Inc. are from product literature. Molecular weights provided therein are not designated as such, but are all consistent as being number average.) The weight average molecular weight ($M_w$) of PS732 was determined as indicated in Table 1. A sample of PS732 was analyzed by size exclusion chromatography (SEC) in toluene using three PLgel Mixed B 7.5×300 mm mixed bed columns (Polymer Laboratories, Inc., Amherst, Mass.). The column set was calibrated with narrow-molecular weight distribution polystyrene standards between 595 and 2,750,000 daltons. Distributions and molecular weight averages were not corrected for axial dispersion. The long term precision of $M_w$ (weight average molecular weight) for a broad polystyrene standard using this method is ±5%.

The siloxane polymer was added as a reactant so as to provide a final concentration of 61.91 volume percent (23.14 weight percent).

The crosslinking agent used was a trimethylsilyl-terminated polymethylhydrosiloxane marketed by United Chemical Technologies, Inc., as PS123. This material has a viscosity of 25 to 30, a molecular weight of 2,000 to 2,500, and a methylhydro weight percentage of 30 to 35 (with the remainder dimethyl). The crosslinker was added to provide a volume percentage of 3.03 (1.16 weight percent). Zinc oxide particles were added to provide a concentration of 35 volume percent (75.68 weight percent).

The catalyst used was added to provide a volume percentage of 0.06 (0.02 wt %). The catalyst was added in the form of a solution prepared by mixing 0.022 parts by weight of product PC075 and 1 part by weight of product PS441.2, both marketed by United Chemical Technologies, Inc. Product PC075 is a neutral platinum divinyl complex (2–3% platinum concentration) of chloroplatinic acid and cyclovinylmethyl siloxane. PS441.2 is a vinyldimethyl terminated polydimethylsiloxane having a viscosity of 200.

Figure 1B:
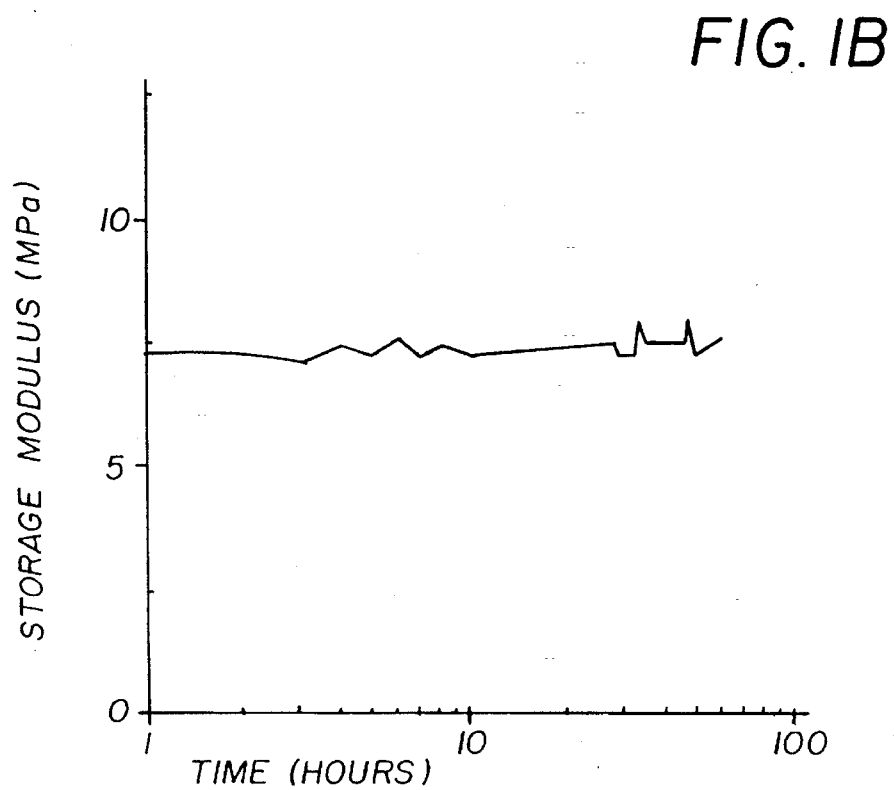

Circular disks (12 mm diameter) were cut from the slab. The storage modulus determination was done in accordance with the method of calculation described in Fitzgerald, et al., "The Effect of Cyclic Stress on the Physical Properties of a Poly(dimethylsiloxane) Elastomer", Polymer Engineering and Science, Vol. 32, No. 18 (September 1992), pp. 1350–1357. Six of the circular disks were stacked, one upon the other, weighed, and then placed in a test instrument called a Mechanical Energy Resolver (also referred to herein as an "MER"), commercially available from Instrumentors, Inc. Strongsville, Ohio, U.S.A. The instrument heated the stack to 218° C. and imposed a static compressive force of 8 kg on the stack. The length of the stack under the initial compressive force was then measured, as was the initial hardness (expressed in terms of "Initial storage modulus"). The MER then imposed cyclic stress on the sample stack by sinusoidally varying the initial compressive force by 4 kg rms at a frequency of 30 Hz for 60 hours, while maintaining the 218° C. temperature. After 60 hours, the final hardness ("Final storage modulus") and length of the six-disk stack under the static 8 kg compressive force were measured, as was the final weight of the sample stack. Results of these tests are presented in FIG. 1 and summarized in Table 2.

Swell of the elastomer in polydimethylsiloxane release oil was measured by weighing a piece of slab prior to immersion in 350 centistoke polydimethylsiloxane oil marketed by Dow Corning Corp. of Midland, Mich. as DC200. The slab was incubated in oil for 7 days at 175° C., blotted dry, and weighed again. The percentage change in weight is designated "Oil swell" in Table 3.

A fuser member in accordance with the invention could be prepared as follows. The outer surface of a rigid cylindrical aluminum core would be scrubbed clean, rinsed with hot water, and dried. The cores would then be wiped clean with isopropyl alcohol or other suitable solvent. To this core would be applied a thin layer of primer (obtainable commercially from Dow Corning Co., U.S.A., under the trade designation DC92-023) using a brush and then drying in ambient air (room temperature) for one hour.

The base cushion layer formulation described above would then be degassed and injected into a mold surrounding the core to mold the base cushion layer to the core. The material would then be left in the mold for 2 hours at 100° C. The roller would then be removed from the mold and cured as follows: heat to 205° C. over the course of 2 hours and hold at 205° C. for an additional 8 hours. The covered roll would then be cooled to room temperature and optionally ground to provide a desired surface finish. An oil-barrier layer of poly(vinylidene fluoride-co-hexafluoropropylene) (obtainable commercially from DuPont, U.S.A., under the trademark, Viton A) could then be coated to a thickness of about 25 micrometers on the base cushion layer to yield the final fuser member. Fuser members could be prepared in the same manner using the elastomers of the other Examples.

Fuser members could also be prepared using multiple layers of the elastomers of the Examples, such as a layer of diphenyl elastomer of the invention over a layer of 100 percent dimethyl elastomer of the invention. A base cushion layer of a 100 percent dimethyl elastomer of the invention would be prepared as described above. The covered roller could then be treated by a process such as corona discharge treatment to enhance adhesion of the overcoat. An overcoat layer of diphenyl elastomer of the invention would then be injected into a mold to completely cover the dimethyl elastomer base cushion layer. The roller would be cured in the mold for 2 hours at 100° C. and removed from the mold. It could then be cured by ramping to 205° C. over 2 hours and holding at 205° C. for 8 additional hours before being cooled to room temperature and removed from the mold. The roller could optionally be ground to provide a desired surface finish.

Swell of the elastomer in PDMS release oil was measured by weighing a piece of slab prior to immersion in 350 ctsk PDMS oil (DC200, Dow Corning). The slab was incubated in oil for 7 days at 175° C., blotted dry, and weighed again. The change in weight is designated the oil swell in Table 3.

EXAMPLE 2: 16% diphenyl, 35% zinc oxide, siloxane reactant $M_w$=14,100

Elastomer was prepared and analyzed in substantially the same manner as in Example 1, except the siloxane used was a vinyl terminated poly(diphenyldimethyl)siloxane marketed by United Chemical Technologies, Inc., as PS782. PS782 is 16 mole percent diphenyl and 84 mole percent dimethyl. This material is described by United Chemical Technologies, Inc. as having a molecular weight of 9300 and a nominal viscosity of 500.

Figure 2A:
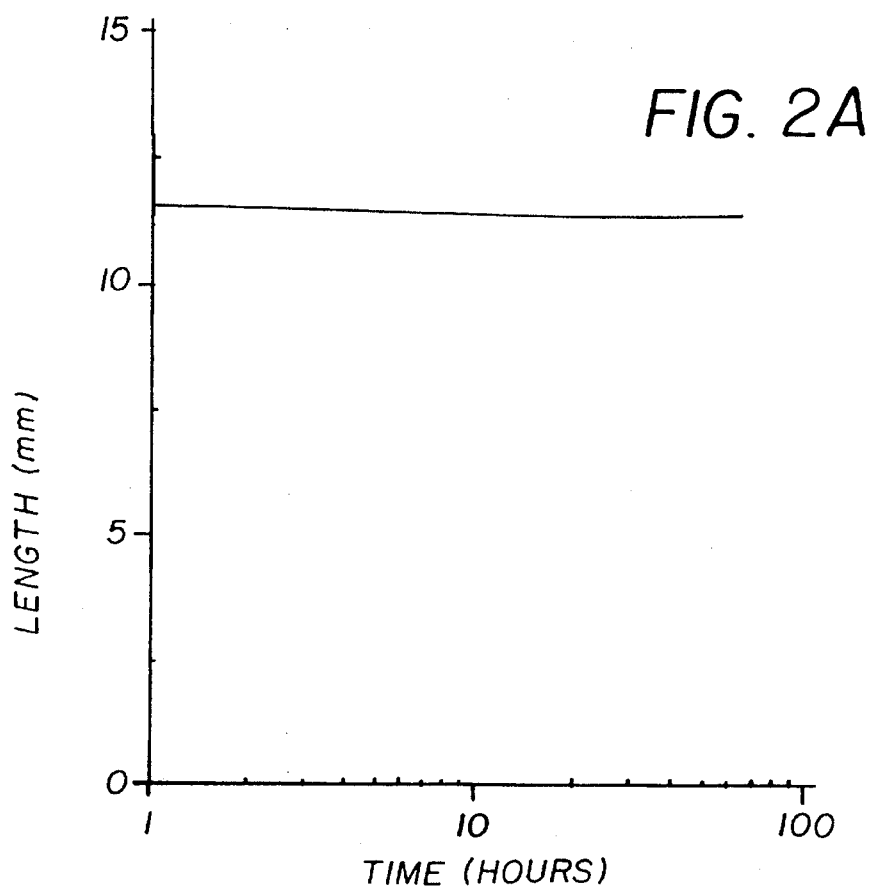
FIG. 2 is a graph of fractional length and storage modulus vs. time for the material of Example 2.
Figure 2B:
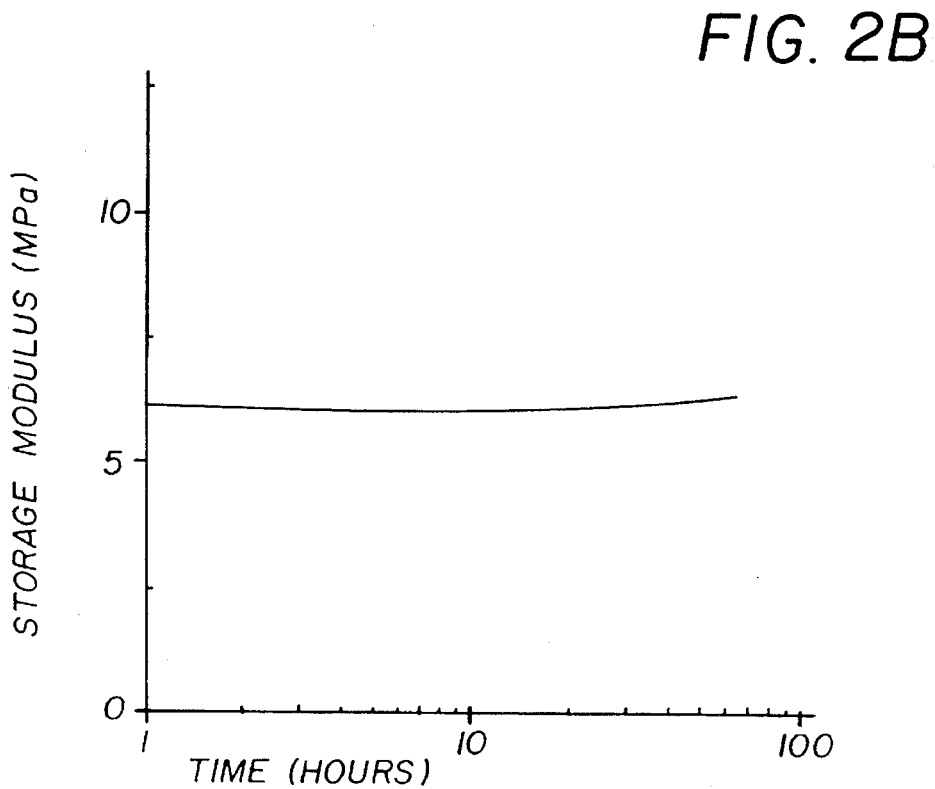

The siloxane was added as a reactant so as to provide a final concentration of 61.91 volume percent (23.14 weight percent). Results are presented in FIG. 2 and Tables 1–3.

EXAMPLE 3: 24% diphenyl, 35% zinc oxide

Figure 3A:
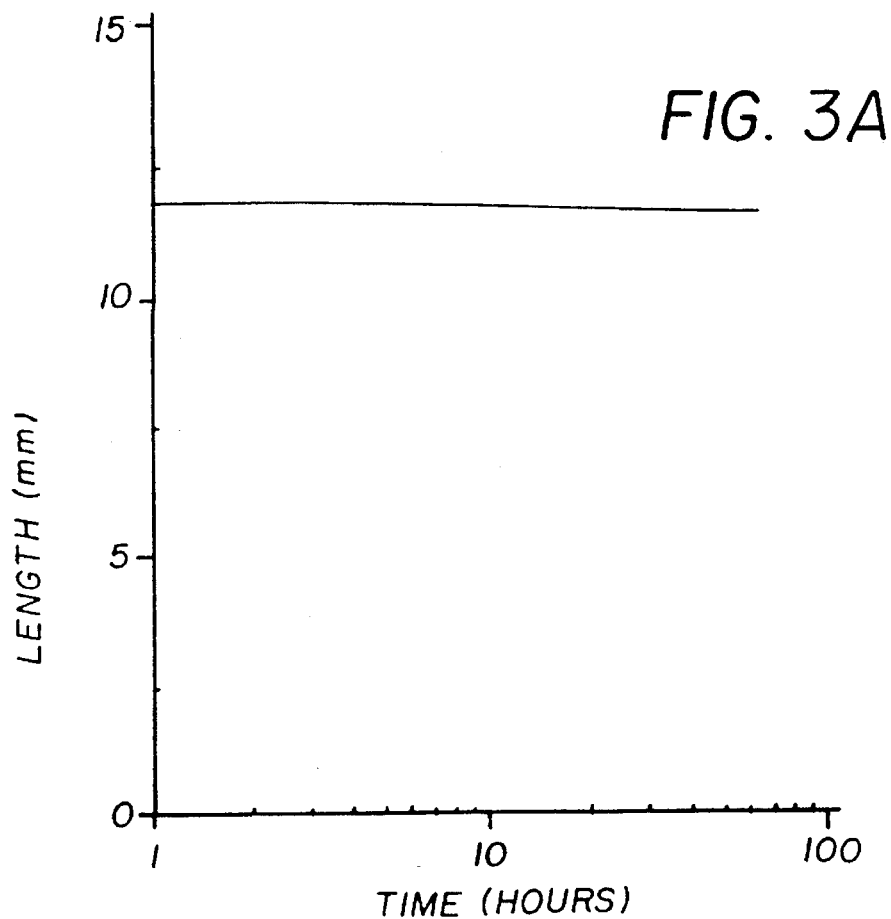
FIG. 3 is a graph of fractional length and storage modulus vs. time for the material of Example 3.
Figure 3B:
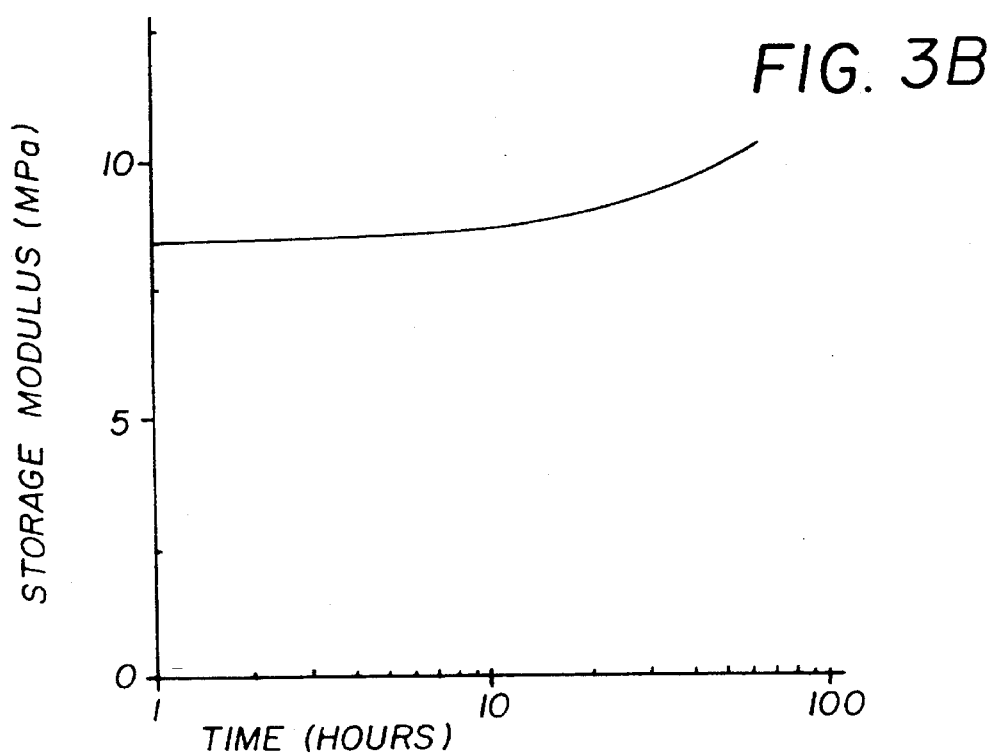

Elastomer was prepared and analyzed in substantially the same manner as in Example 1, except the siloxane used was a vinyl terminated poly(diphenyldimethyl)siloxane marketed by United Chemical Technologies, Inc., as PS793. PS793 is 23.5 mole percent diphenyl and 76.5 mole percent dimethyl. This material is described by United Chemical Technologies, Inc. as having a molecular weight of 13,200 and a nominal viscosity of 1500. The siloxane was added so as to provide a final concentration of 61.91 volume percent (23.14 weight percent). Results are presented in FIG. 3 and Tables 1–3.

EXAMPLE 4: 16% diphenyl, 35% zinc oxide

Figure 4A:
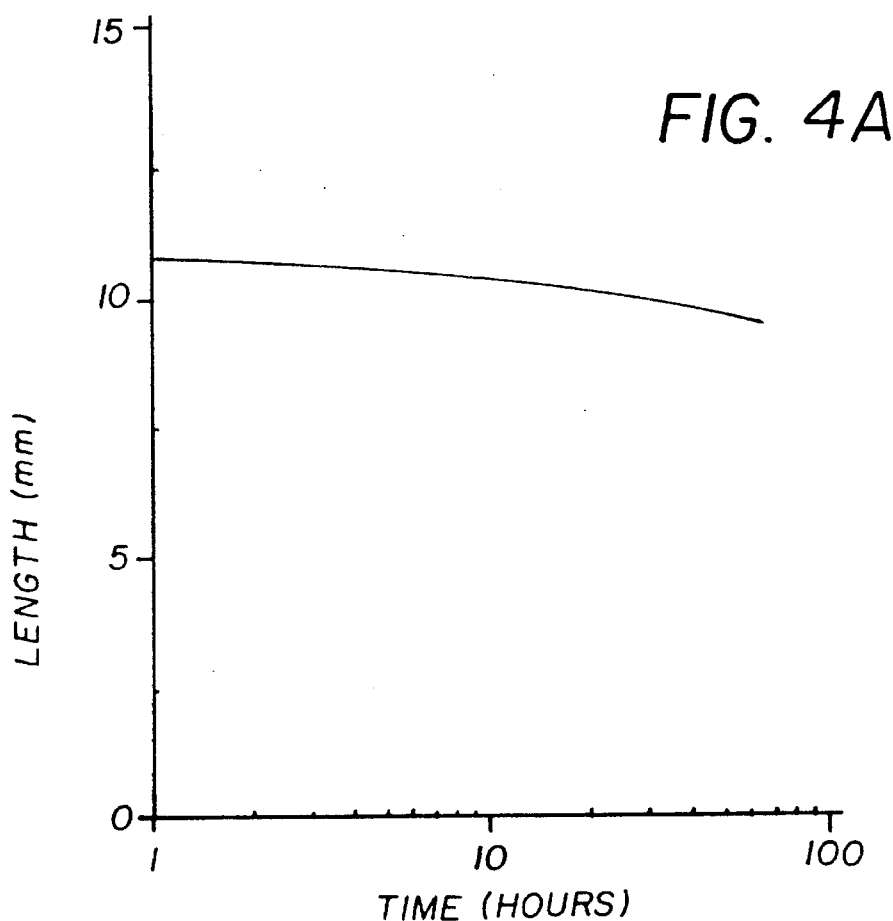
FIG. 4 is a graph of fractional length and storage modulus vs. time for the materials of Example 4.
Figure 4B:
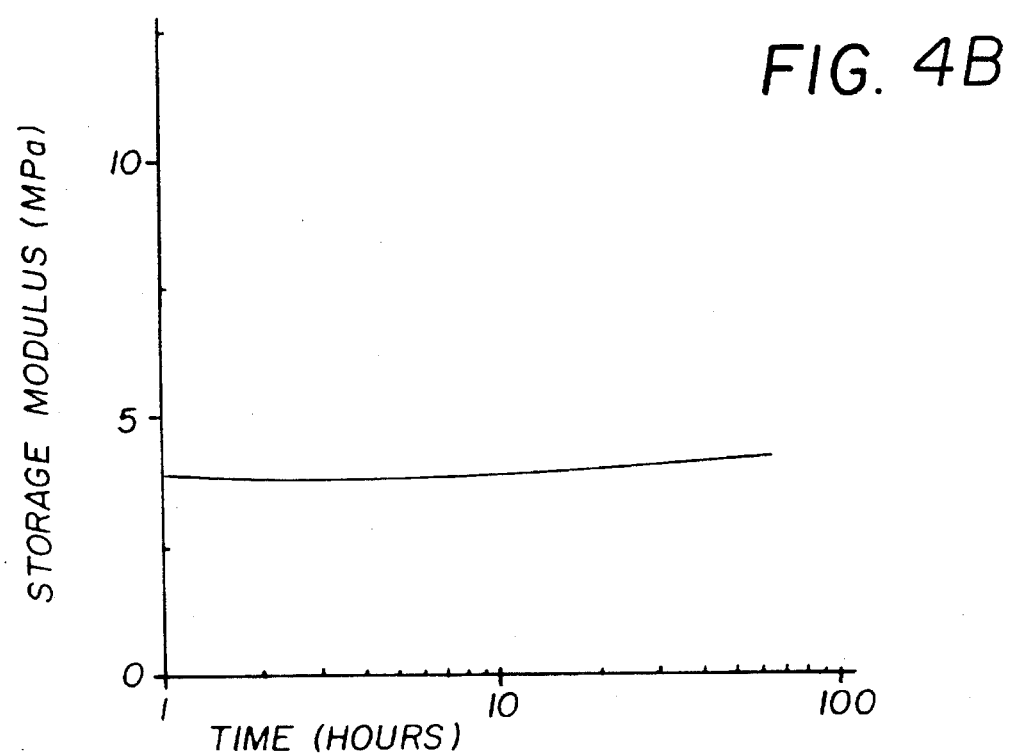

Elastomer was prepared and analyzed in substantially the same manner as in Example 1, except the siloxane used was a vinyl terminated poly(diphenyldimethyl)siloxane marketed by United Chemical Technologies, Inc., as PS784 and the catalyst used contained 0.0022 parts PC075 to 1 part PS441.2. PS784 is 16 mole percent diphenyl and 84 mole percent dimethyl. This material is described by United Chemical Technologies, Inc. as having a molecular weight of 35,300 and a nominal viscosity of 5000. The siloxane was added so as to provide a final concentration of 61.91 volume percent (23.14 weight percent). Results are presented in FIG. 4 and Tables 1–3.

EXAMPLE 5: 16% diphenyl, 35% zinc oxide, siloxane reactant $M_w$=68,200

Figure 5A:
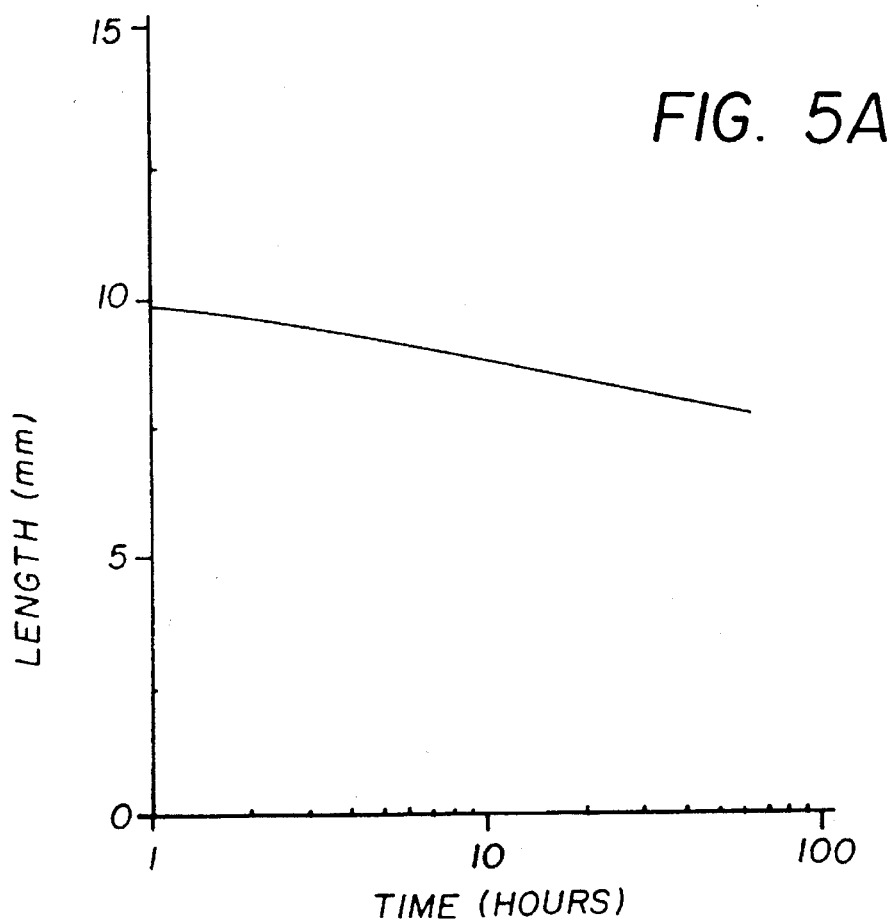
FIG. 5 is a graph of fractional length and storage modulus vs. time for the materials of Example 5.
Figure 5B:
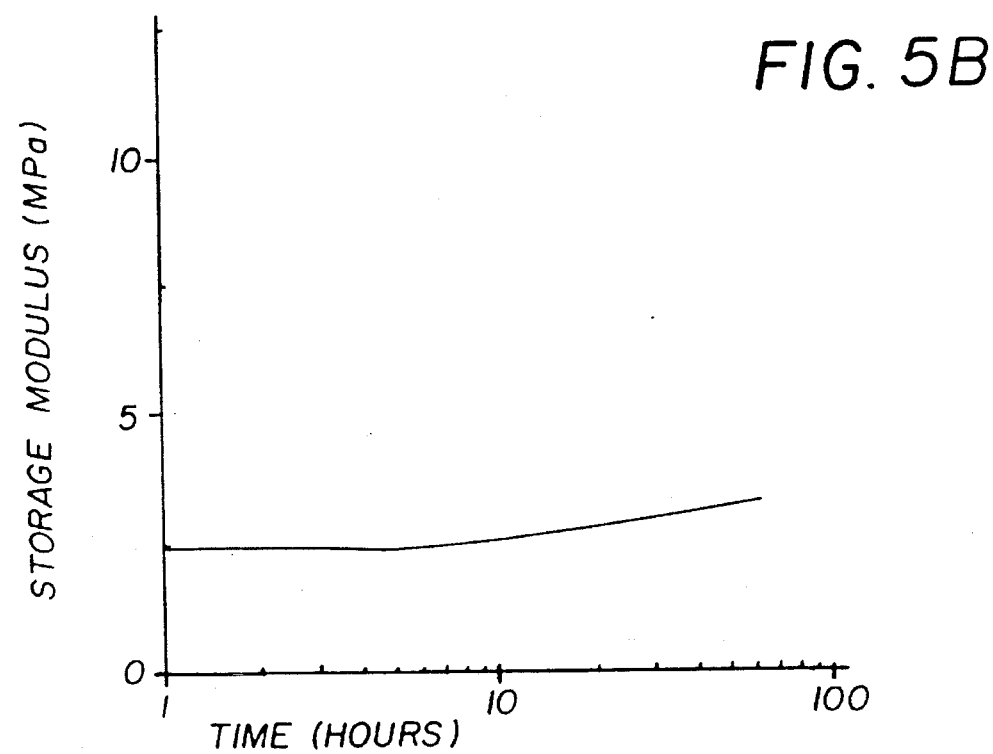

Elastomer was prepared and analyzed in substantially the same manner as in Example 1, except the siloxane used was a vinyl terminated poly(diphenyldimethyl)siloxane marketed by United Chemical Technologies, Inc., as PS785. PS785 is 16 mole percent diphenyl and 84 mole percent dimethyl. This material is described by United Chemical Technologies, Inc. as having a molecular weight of 54,900 and a nominal viscosity of 10,000. The siloxane was added so as to provide a final concentration of 61.91 volume percent (23.14 weight percent). Results are presented in FIG. 5 and Tables 1–3.

EXAMPLE 6: 16% diphenyl, 5% zinc oxide

Elastomer was prepared in substantially the same manner as in Example 2, except as follows. The siloxane used, PS782, had a final concentration of 90.48 volume percent (72.96 weight percent). The PS123 crosslinker had a final concentration of 4.43 volume percent (3.65 weight percent). The zinc oxide had a final concentration of 5.0 volume percent (23.32 weight percent). The catalyst had a final concentration of 0.09 volume percent (0.07 weight percent).

Oil swell was measured as described in Example 1. Thermal conductivity was measured with a Holometrix TCA-100 thermal conductivity analyzer between 50° C. and 200° C. The value at 175° C. is reported. Shore A Hardness was measured according to ASTM D2240. Results are presented in Tables 3–4.

EXAMPLE 7: 16% diphenyl, 8% zinc oxide

Elastomer was prepared and evaluated in substantially the same manner as in Example 6, except as follows. The siloxane used, PS782, had a final concentration of 87.62 volume percent (63.33 weight percent). The PS123 crosslinker had a final concentration of 4.29 volume percent (3.17 weight percent). The zinc oxide had a final concentration of 8.0 volume percent (33.44 weight percent). The catalyst had a final concentration of 0.08 volume percent (0.06 weight percent). Results are presented in Tables 3–4.

EXAMPLE 8: 16% diphenyl, 20% zinc oxide

Elastomer was prepared and evaluated in substantially the same manner as in Example 6, except as follows. The siloxane used, PS782, had a final concentration of 76.19 volume percent (38.92 weight percent). The PS123 crosslinker had a final concentration of 3.73 volume percent (1.95 weight percent). The zinc oxide had a final concentration of 20.0 volume percent (59.09 weight percent). The catalyst had a final concentration of 0.07 volume percent (0.04 weight percent). Results are presented in Tables 3–4.

EXAMPLE 9: 16% diphenyl, 40% zinc oxide

Figure 6A:
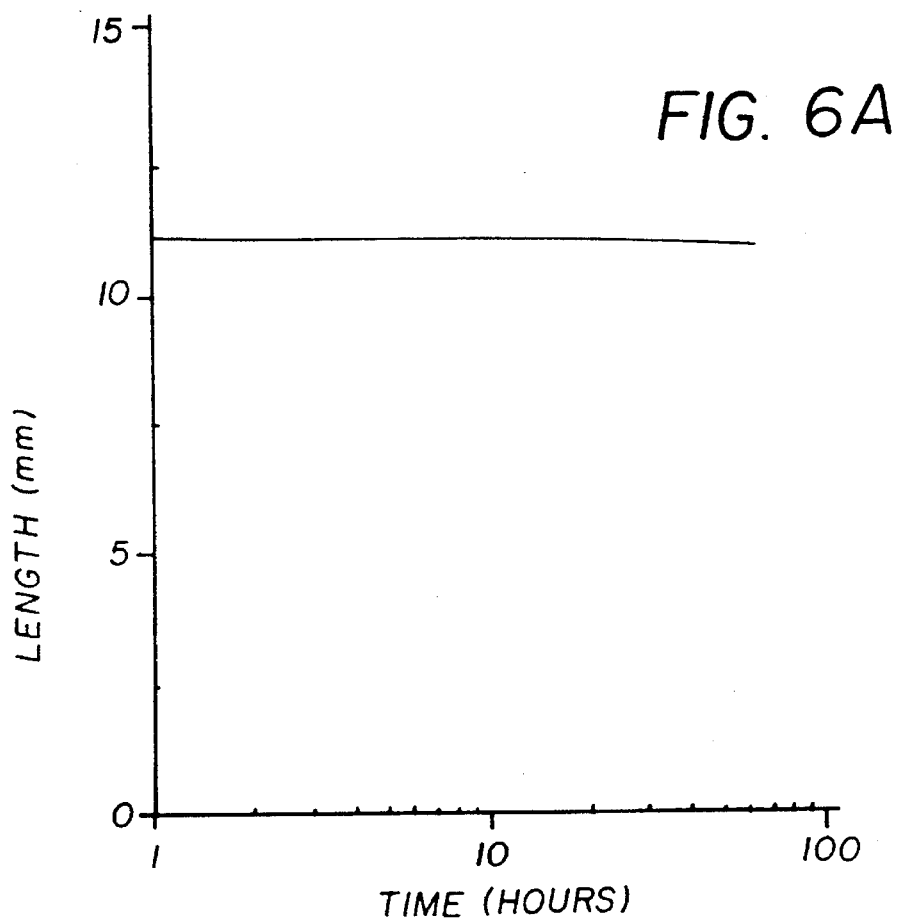
FIG. 6 is a graph of fractional length and storage modulus vs. time for the materials of Example 9.
Figure 6B:
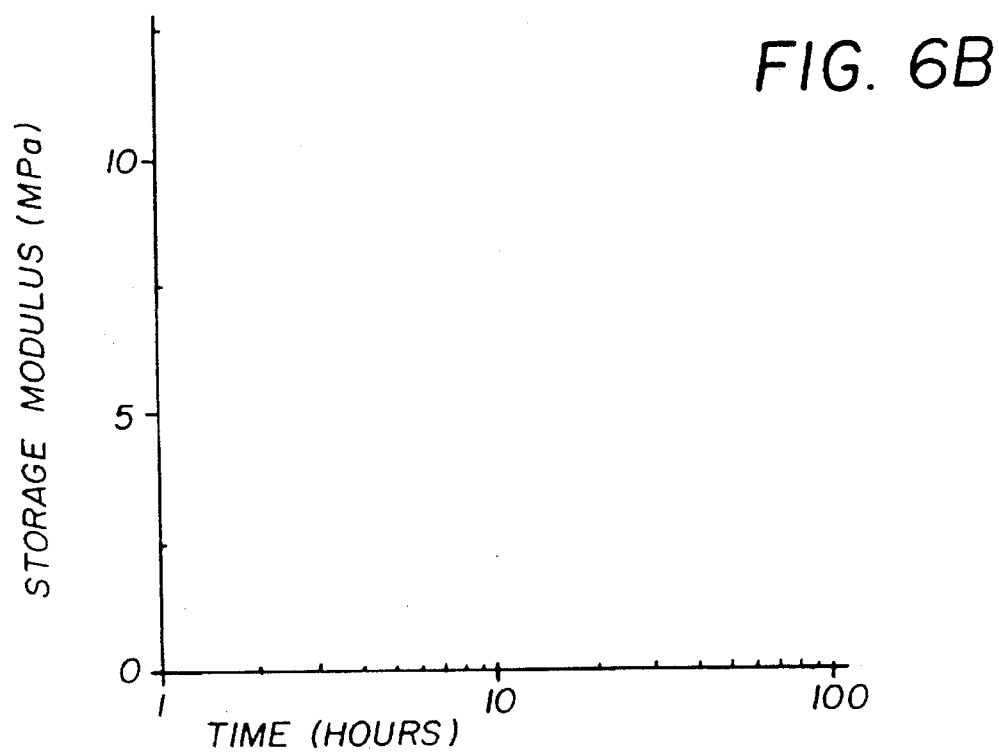

Elastomer was prepared in substantially the same manner as in Example 6, except as follows. The siloxane used, PS782, had a final concentration of 57.15 volume percent (19.61 weight percent). The PS123 crosslinker had a final concentration of 2.80 volume percent (0.98 weight percent). The zinc oxide had a final concentration of 40.0 volume percent (79.39 weight percent). The catalyst had a final concentration of 0.06 volume percent (0.02 weight percent). The elastomer was evaluated substantially as described in Example 1. Results are presented in FIG. 6 and Tables 2–3.

EXAMPLE 10: 3% diphenyl, 10% zinc oxide

Figure 7A:
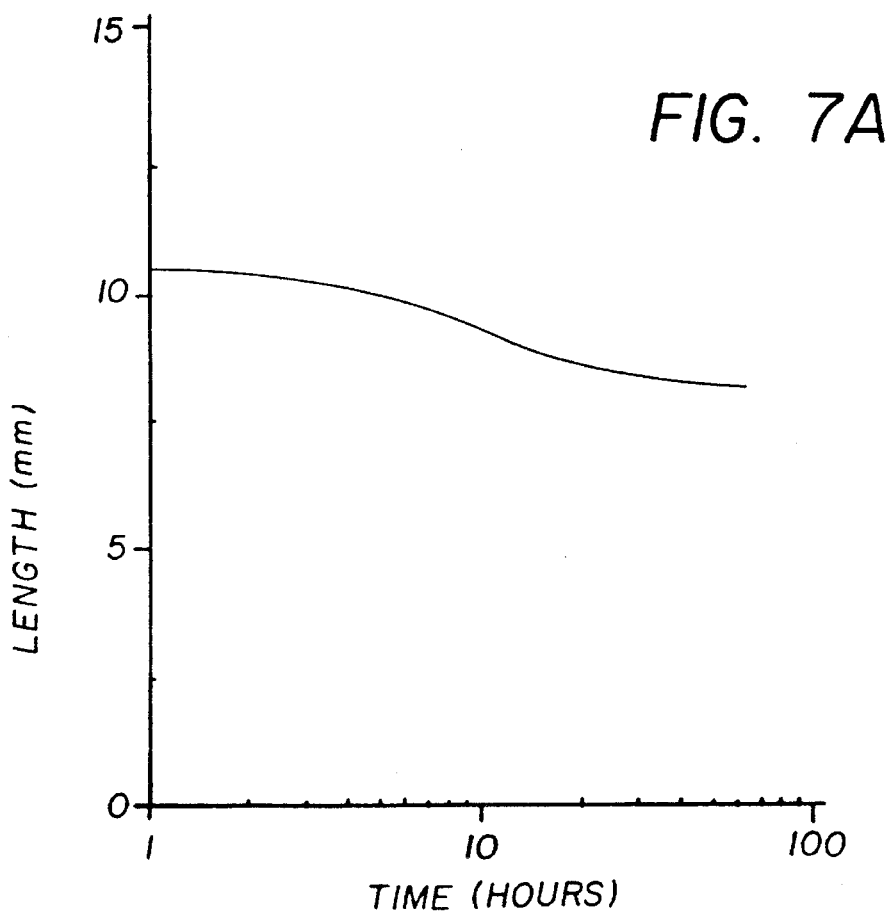
FIG. 7 is a graph of fractional length and storage modulus vs. time for the materials of Example 10.
Figure 7B:
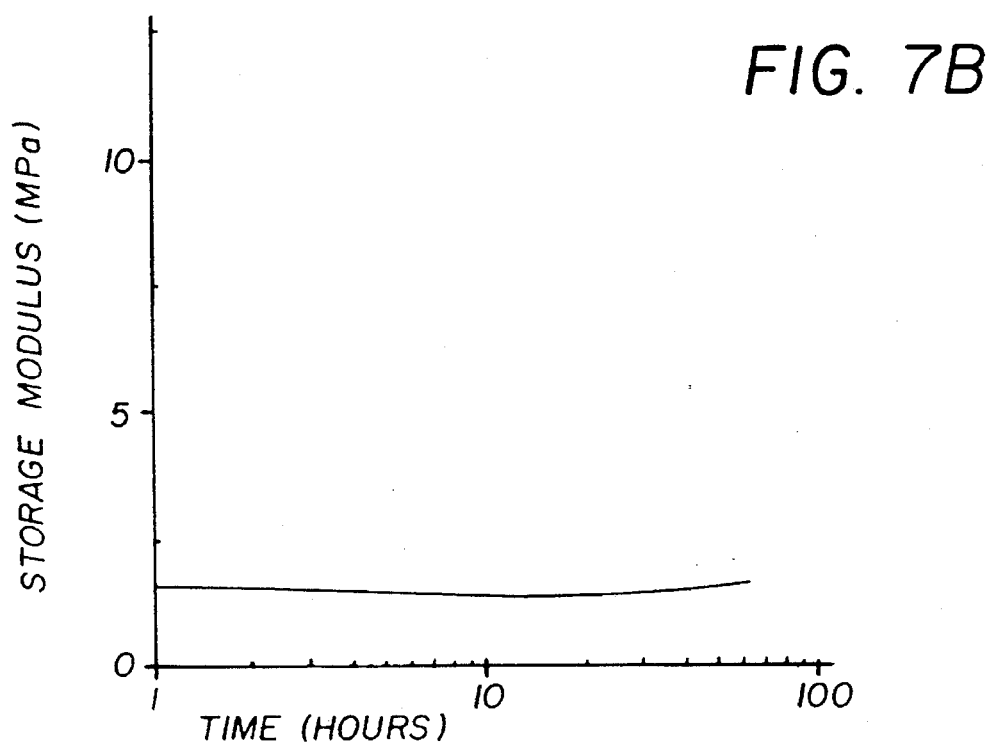

Elastomer was prepared and evaluated in substantially the same manner as in Example. 1, except as follows. The siloxane used, PS732, had a final concentration of 85.72 volume percent (57.94 weight percent). The PS123 crosslinker had a final concentration of 4.20 volume percent (2.90 weight percent). The zinc oxide had a final concentration of 10.0 volume percent (39.10 weight percent). The catalyst had a final concentration of 0.08 volume percent (0.06 weight percent). Results are presented in FIG. 7 and Tables 2–3.

EXAMPLE 11: 16% diphenyl, 35% zinc oxide

Elastomer was prepared and evaluated in substantially the same manner as in Example 4, except as follows. The siloxane used, PS784, had a final concentration of 61.44 volume percent (24.32 weight percent). The PS123 crosslinker had a final concentration of 3.23 volume percent (1.22 weight percent). The zinc oxide had a final concentration of 35.0 volume percent (74.34 weight percent). The catalyst had a final concentration of 0.33 volume percent (0.12 weight percent). The starting materials were injected into the mold using a hydraulic press. The mold and materials were held in the press for 2 hours before being removed from the press and allowed to stand overnight. The slab (5 in.×5 in.×0.075 in.) was removed from the mold and further incubated by ramping to 205° C. over the course of 12 hours and holding at 205° C. for an additional 18 hours. The resulting elastomer was then evaluated.

Figure 8A:
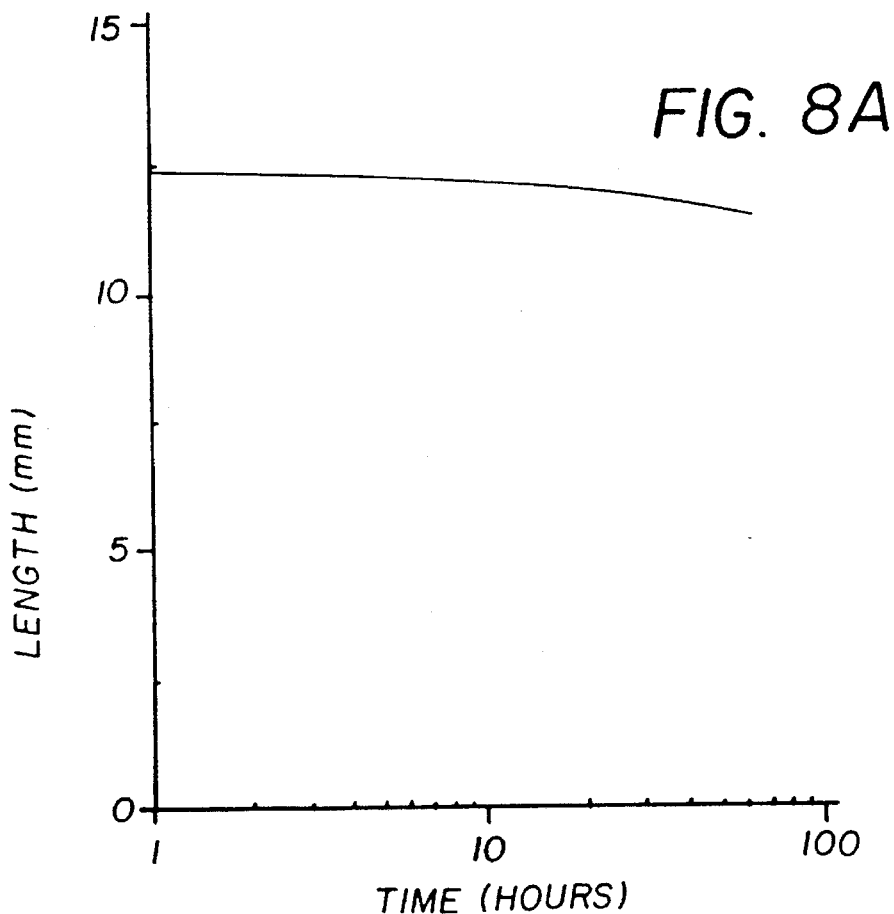
FIG. 8 is a graph of fractional length and storage modulus vs. time for the materials of Example 11.
Figure 8B:
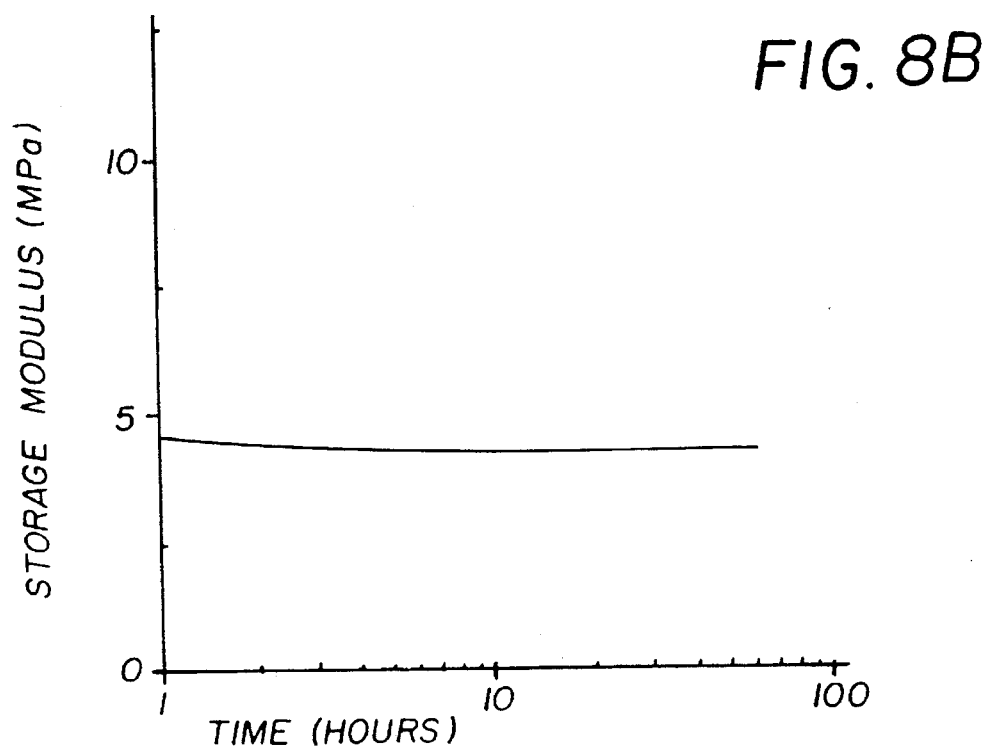

Results are presented in FIG. 8 and Tables 2–3.

COMPARATIVE EXAMPLE 1: 3% diphenyl, 35% aluminum oxide

Figure 9A:
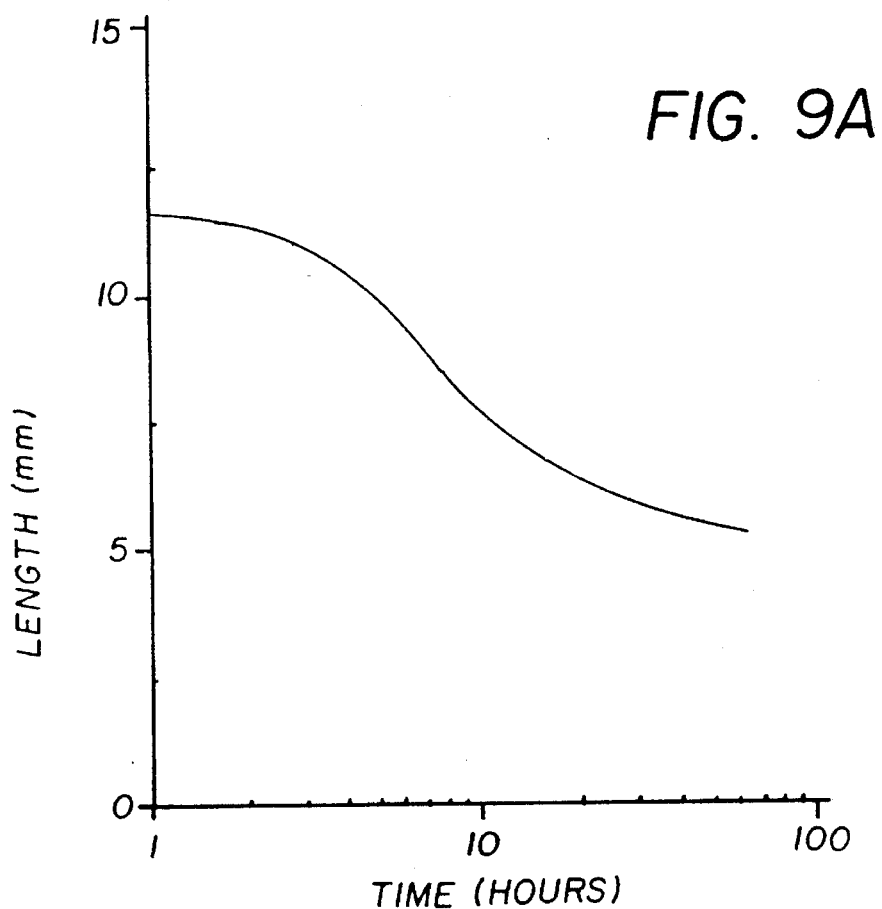
FIG. 9 is a graph of fractional length and storage modulus vs. time for the materials of Comparative Example 1.
Figure 9B:
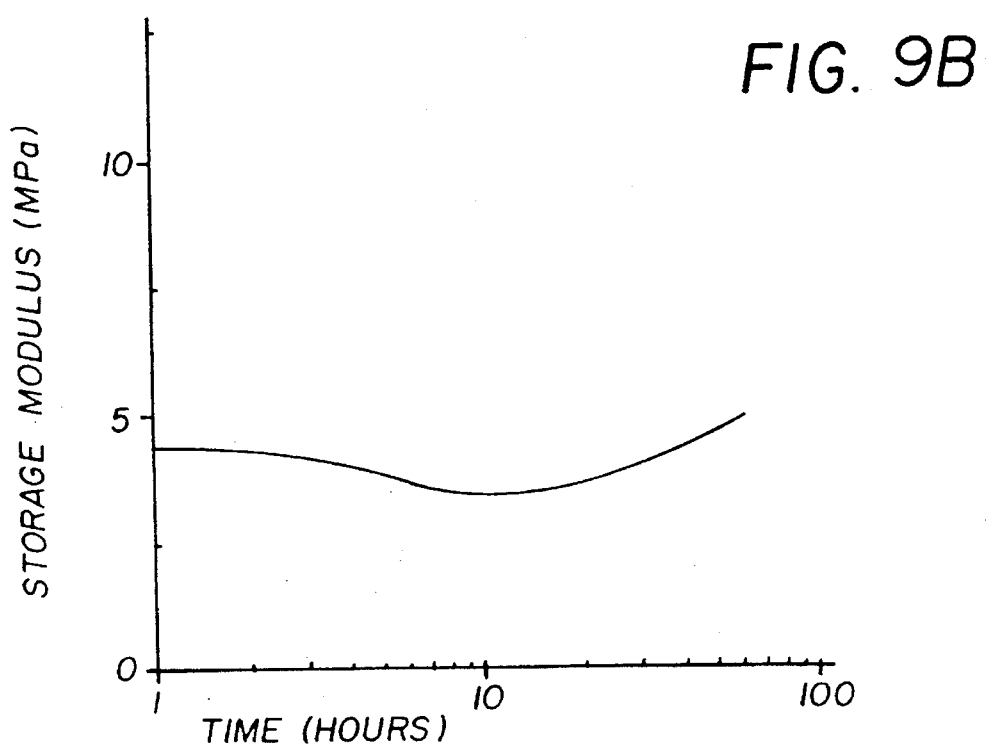

Elastomer was prepared and evaluated in substantially the same manner as in Example 1, except as follows. The siloxane used, PS732, had a final concentration of 61.91 volume percent (29.72 weight percent). The PS123 crosslinker had a final concentration of 3.03 volume percent (1.49 weight percent). The zinc oxide was replaced by aluminum oxide having a final concentration of 35.0 volume percent (68.77 weight percent). The catalyst contained 0.0022 parts PC075 to one part PS441.2 and had a final concentration of 0.06 volume percent (0.03 weight percent). Results are presented in FIG. 9 and Tables 2–3.

COMPARATIVE EXAMPLE 2: 16% diphenyl, 35% aluminum oxide

Figure 10A:
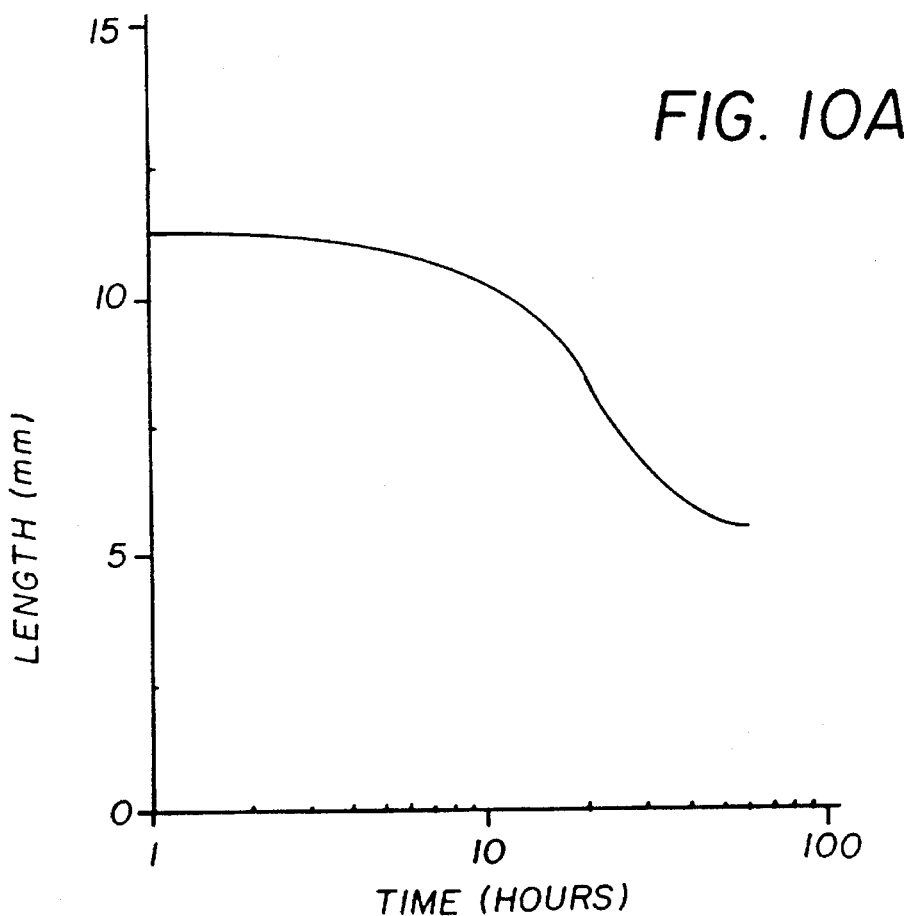
FIG. 10 is a graph of fractional length and storage modulus vs. time for the materials of Comparative Example 2.
Figure 10B:
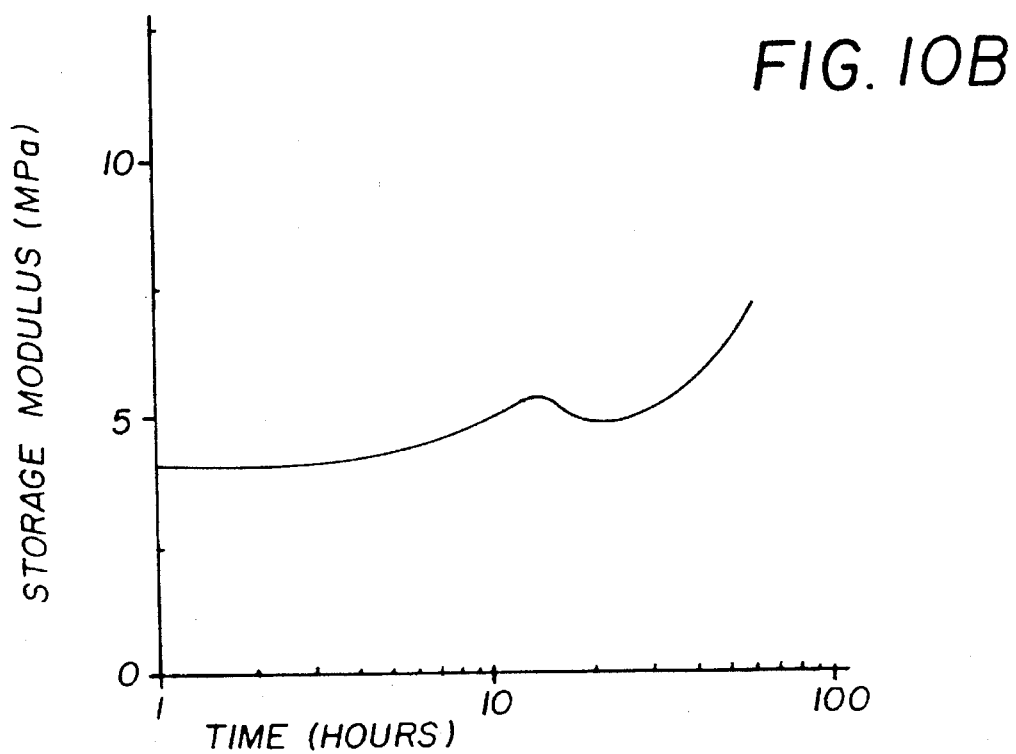

Elastomer was prepared and evaluated in substantially the same manner as in Example 2, except as follows. The siloxane used, PS782, had a final concentration of 61.91 volume percent (29.72 weight percent). The PS123 crosslinker had a final concentration of 3.03 volume percent (1.49 weight percent). The zinc oxide was replaced by aluminum oxide having a final concentration of 35.0 volume percent (68.77 weight percent). The catalyst had a final concentration of 0.06 volume percent (0.03 weight percent). Results are presented in FIG. 10 and Tables 2–3.

COMPARATIVE EXAMPLE 3: 24% diphenyl, 35% aluminum oxide

Figure 11A:
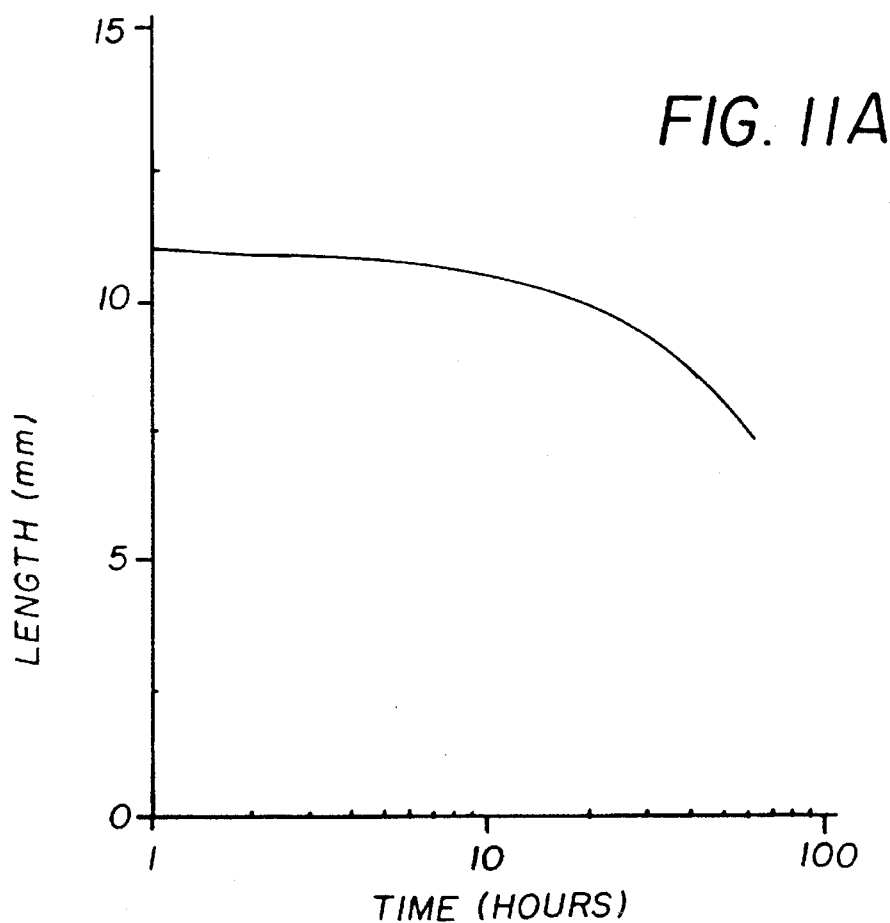
FIG. 11 is a graph of fractional length and storage modulus vs. time for the materials of Comparative Example 3.
Figure 11B:
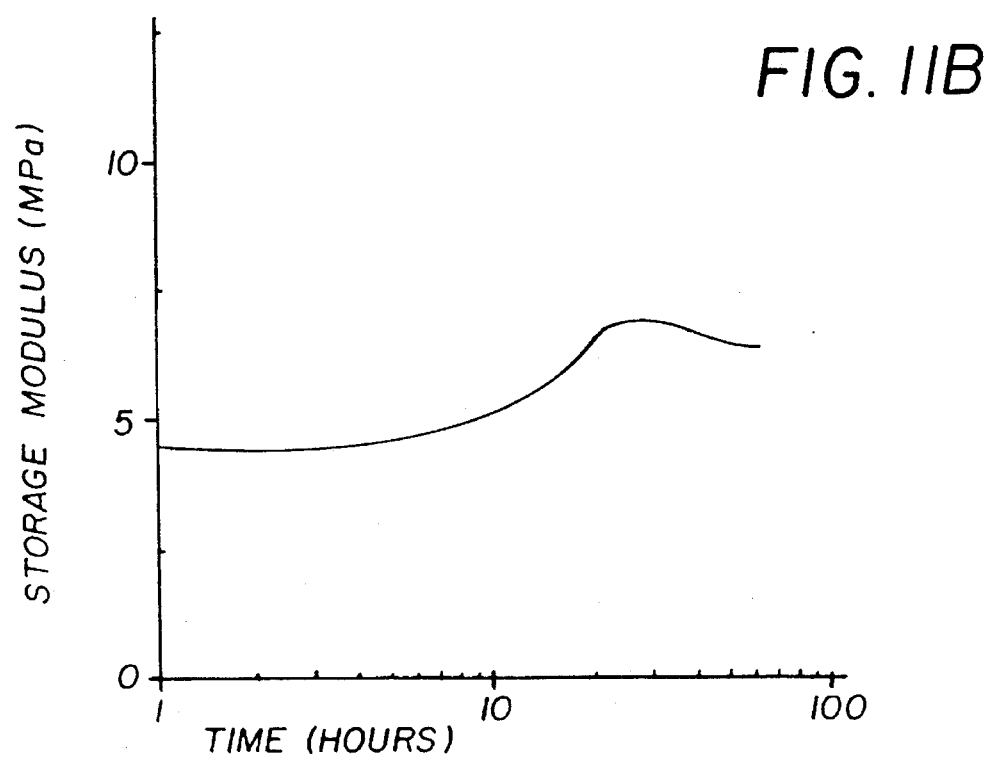

Elastomer was prepared and evaluated in substantially the same manner as in Example 3, except as follows. The siloxane used, PS793, had a final concentration of 61.91 volume percent (29.72 weight percent). The PS123 crosslinker had a final concentration of 3.03 volume percent (1.49 weight percent). The zinc oxide was replaced by aluminum oxide having a final concentration of 35.0 volume percent (68.77 weight percent). The catalyst had a final concentration of 0.06 volume percent (0.03 weight percent). Results are presented in FIG. 11 and Tables 2–3.

COMPARATIVE EXAMPLE 4: 16% diphenyl, 0.35% aluminum oxide

Figure 12A:
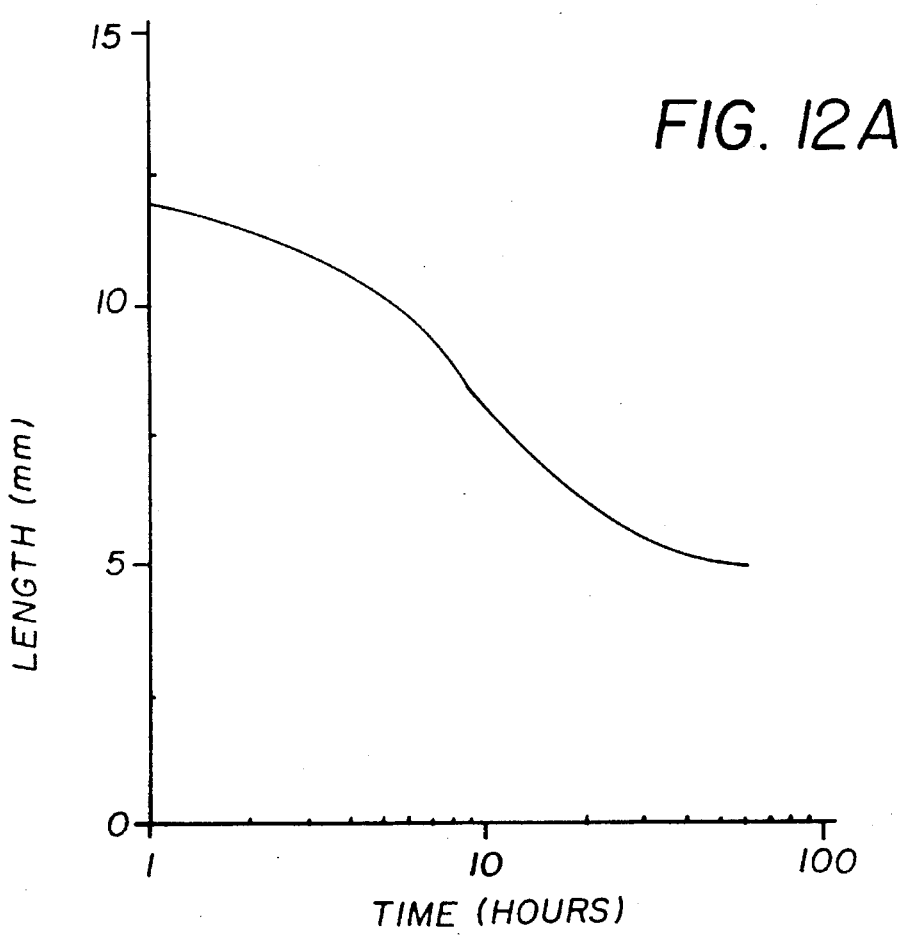
FIG. 12 is a graph of fractional length and storage modulus vs. time for the materials of Comparative Example 4.
Figure 12B:
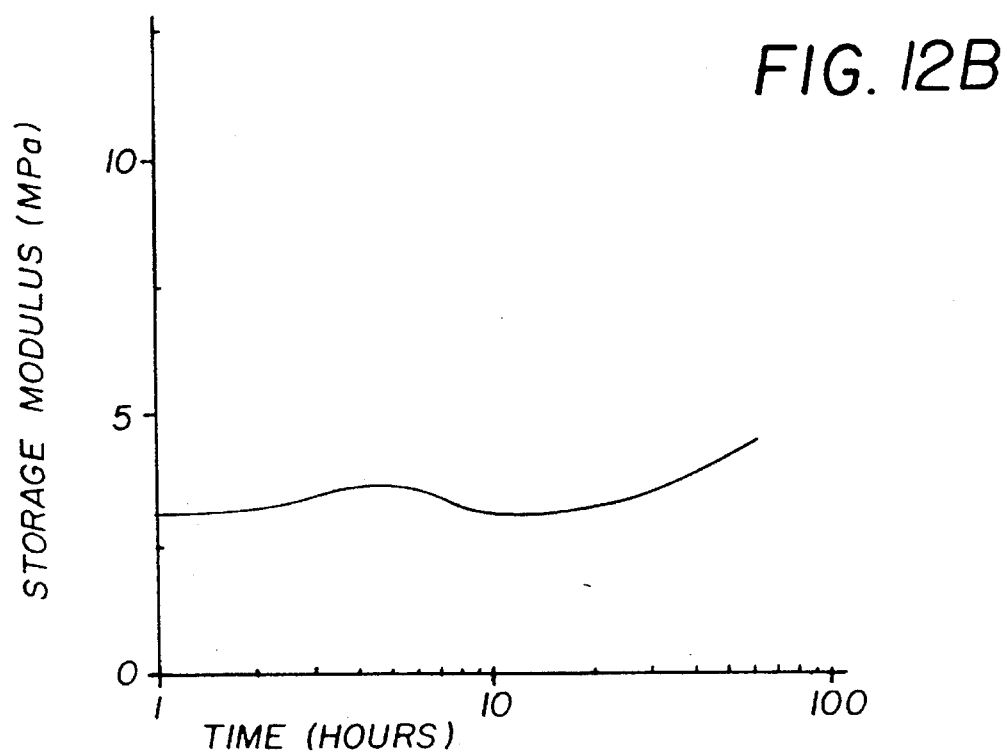

Elastomer was prepared and evaluated in substantially the same manner as in Example 11, except as follows. The siloxane used, PS784, had a final concentration of 61.41 volume percent (31.53 weight percent). The PS123 crosslinker had a final concentration of 3.26 volume percent (1.58 weight percent). The zinc oxide was replaced by aluminum oxide having a final concentration of 35.0 volume percent (64.74 weight percent). The catalyst had a final concentration of 0.33 volume percent (0.15 weight percent). Results are presented in FIG. 12 and Tables 2–3.

Figure 13A:
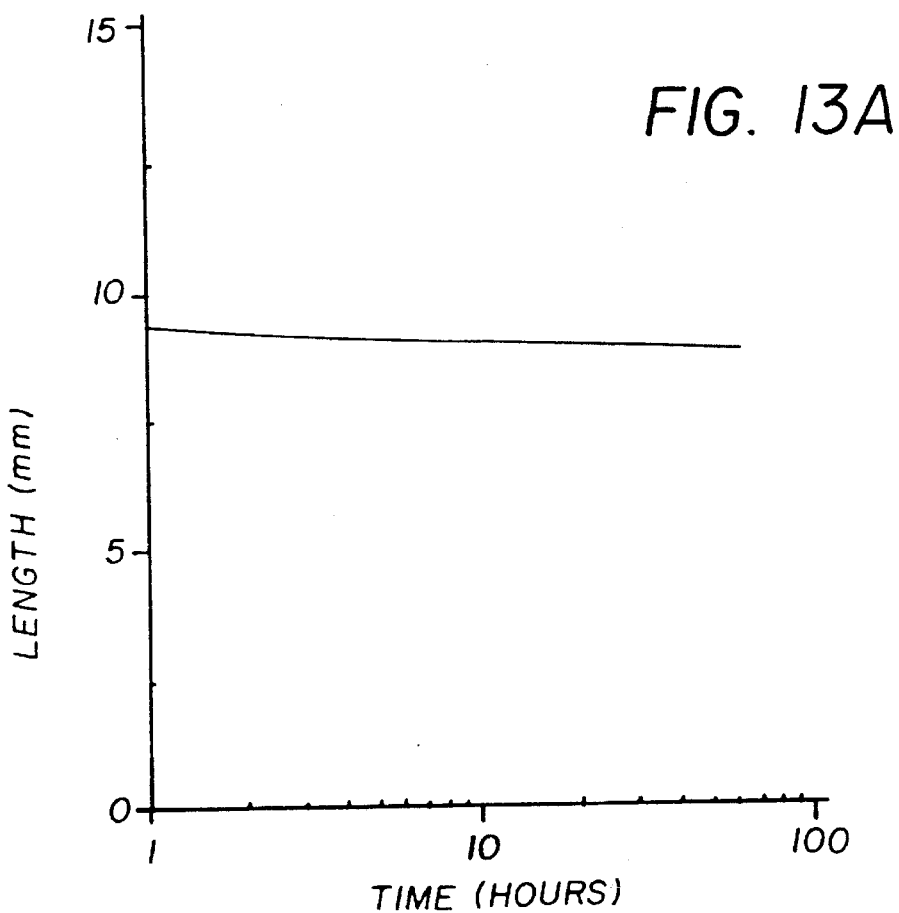
FIG. 13 is a graph of fractional length and storage modulus vs. time for the materials of Comparative Example 5.
Figure 13B:
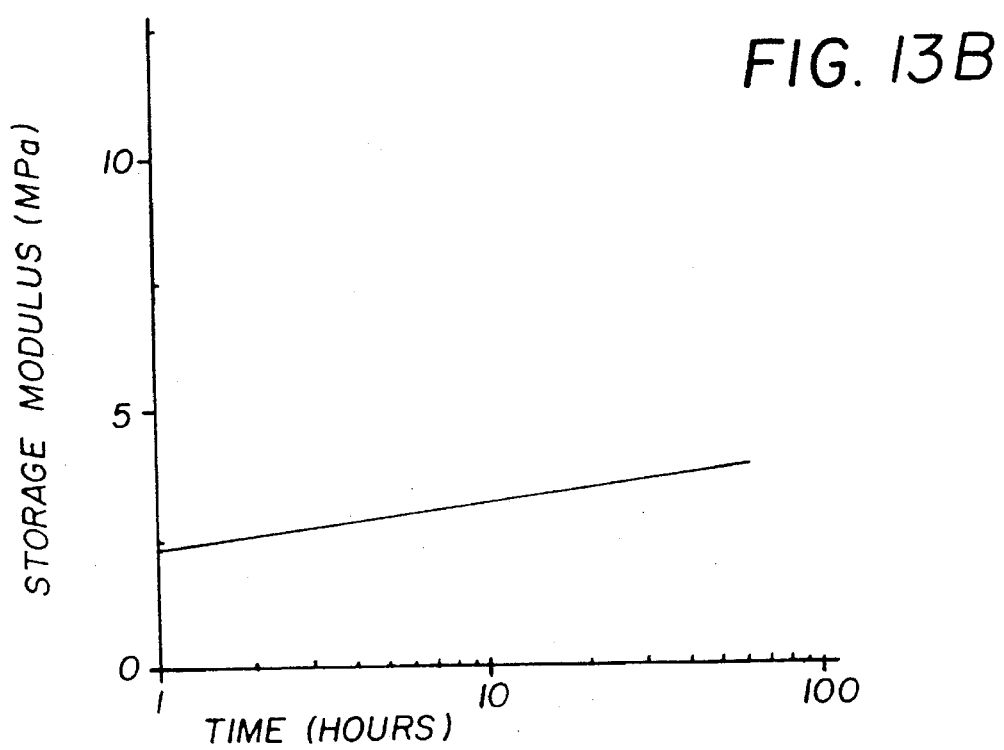

COMPARATIVE EXAMPLE 5: 16% diphenyl, 11.9 vol% zinc oxide, 10 vol% graphite, 1.17 vol% cerium dioxide Elastomer was prepared and evaluated in substantially the same manner as in Example 2, except as follows. The siloxane used, PS782, had a final concentration of 73.03 volume percent (42.84 weight percent). The PS123 crosslinker had a final concentration of 3.84 volume percent (2.13 weight percent). The zinc oxide was replaced by a combination of fillers: zinc oxide (from Aldrich Chemical Company, Milwaukee, Wis., U.S.A.), particle size 100–500 nm) having a final concentration of 11.9 volume percent (40 weight percent), graphite (from Asbury Graphite Mills, Asbury, N.J., U.S.A.) (Grade 850), particle diameters of 1–8 micrometers) having a final concentration of 10 volume percent (10 weight percent), and cerium dioxide (Aldrich Chemical Company, Milwaukee, Wis., U.S.A.), particle size less than 3 micrometers) 1.17 volume percent (5 weight percent). The catalyst had a final concentration of 0.06 volume percent (0.03 weight percent). Results are presented in FIG. 13 and Tables 2–3.

EXAMPLE 12: 100% poly(dimethyl)siloxane., 20% zinc oxide

Figure 14A:
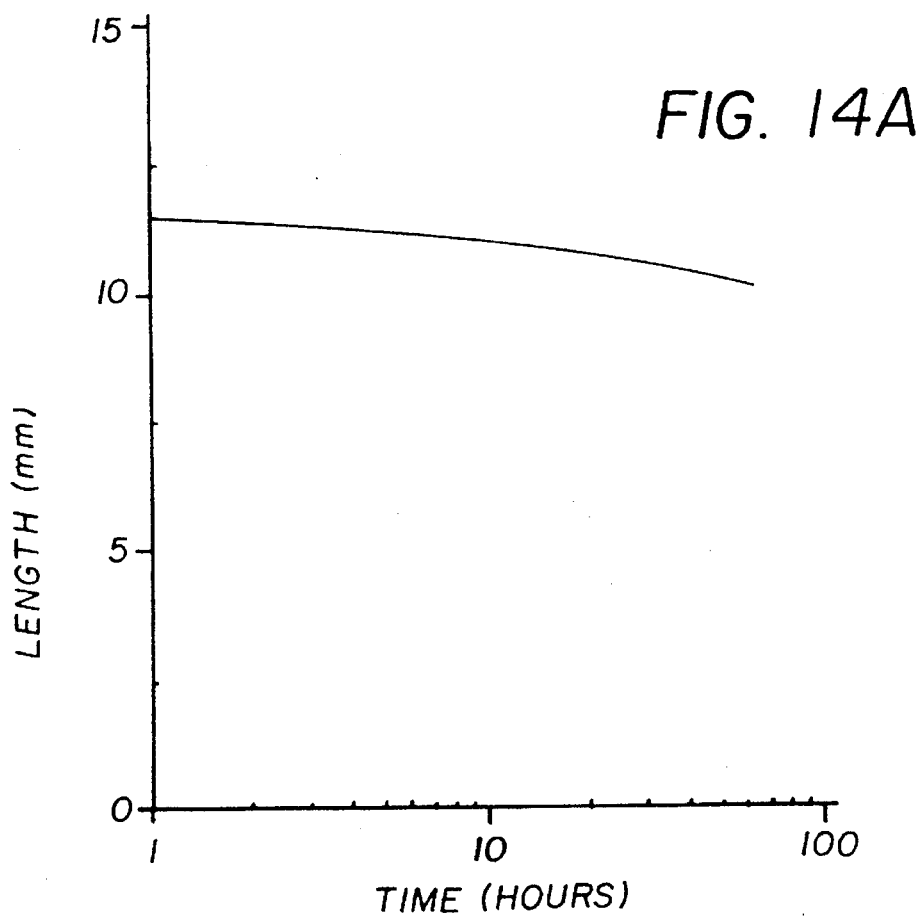
FIG. 14 is a graph of fractional length and storage modulus vs. time for the materials of Example 12.
Figure 14B:
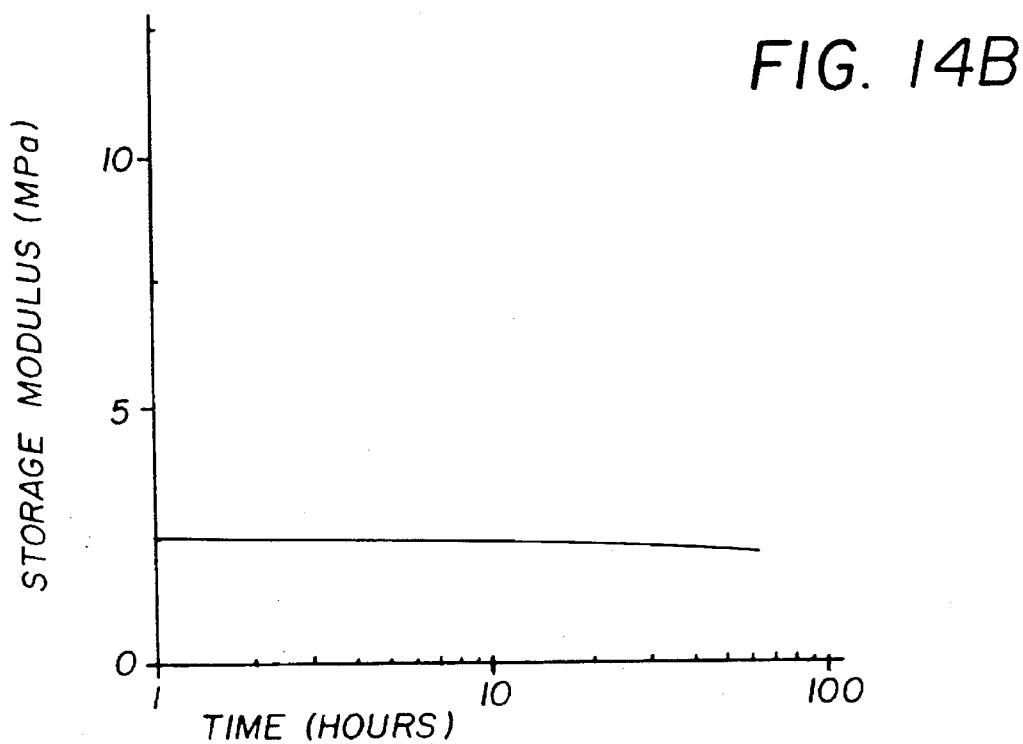

Elastomer was prepared and evaluated in substantially the same manner as in Example 1, except as follows. The siloxane used was a vinyl terminated poly(dimethyl) siloxane marketed by United Chemical Technologies, Inc., as PS442. This material is described by United Chemical Technologies, Inc. as having a viscosity of 500. The siloxane was added so as to provide a final concentration of 76.03 volume percent (38.81 weight percent). The PS123 crosslinker had a final concentration of 3.97 volume percent (1.94 weight percent). The zinc oxide had a final concentration of 20.0 volume percent (59.25 weight percent). The catalyst contained 0.0022 parts PC075 to one part PS441.2 and had a final concentration of 0.06 volume percent (0.02 weight percent). Results are presented in FIG. 14 and Tables 2–3.

EXAMPLE 13: 100% poly(dimethyl)siloxane, 40% zinc oxide

Figure 15A:
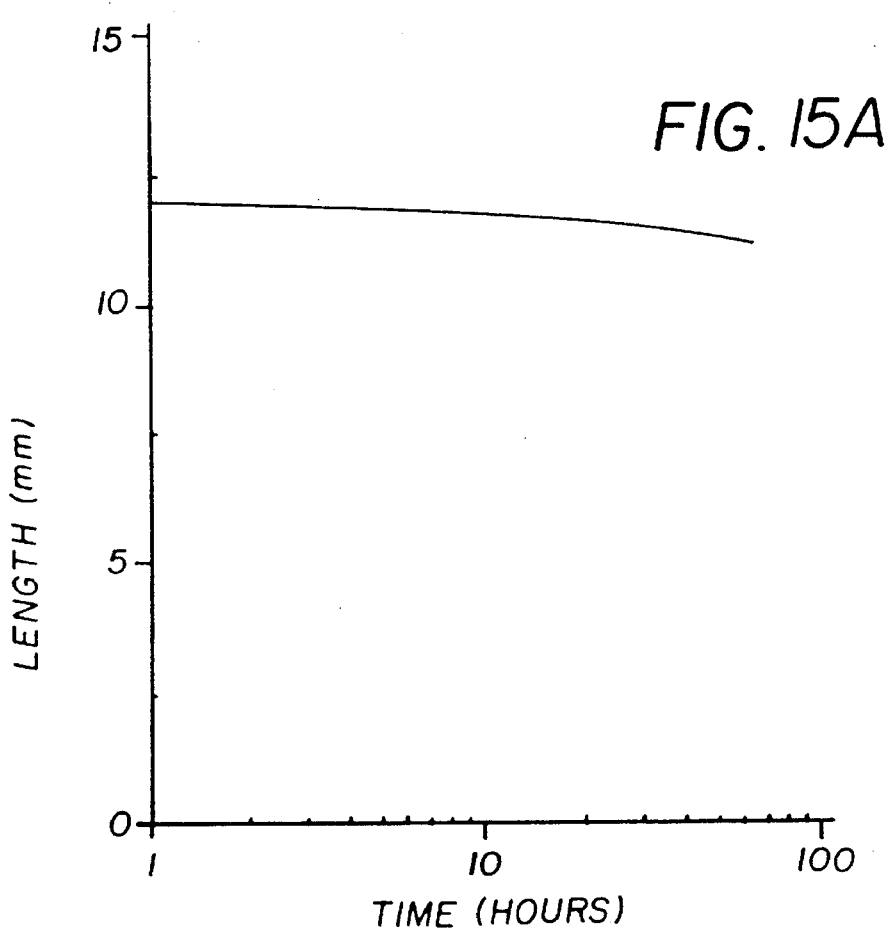
FIG. 15 is a graph of fractional length and storage modulus vs. time for the materials of Example 13.
Figure 15B:
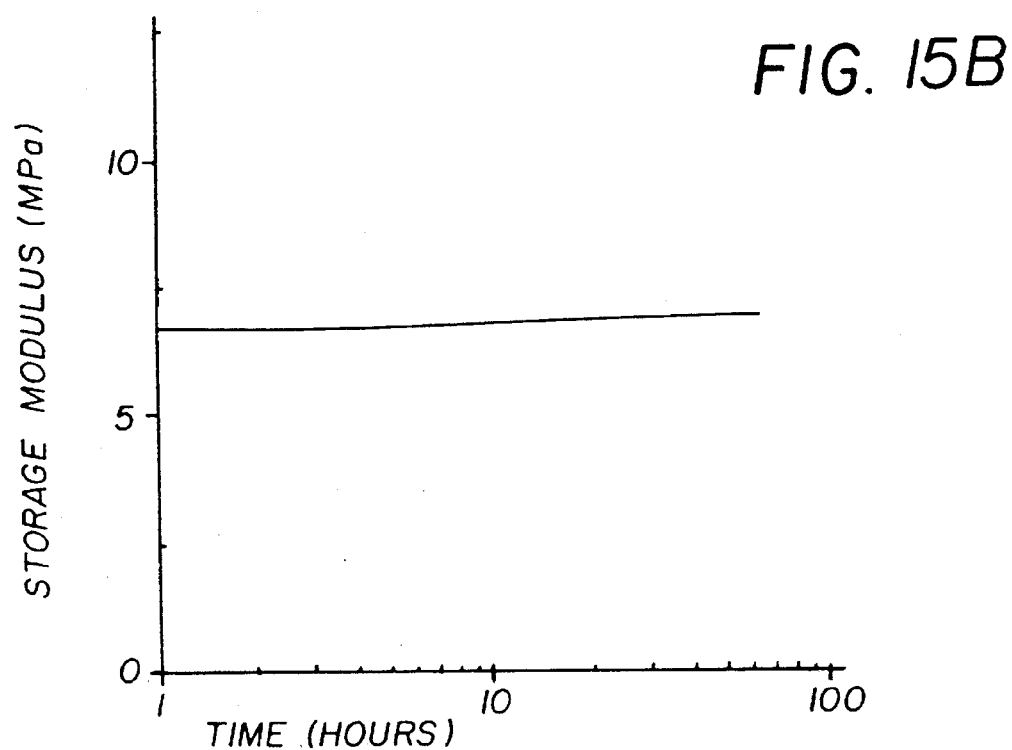

Elastomer was prepared and evaluated in substantially the same manner as in Example 12, except as follows. The siloxane used, PS442, was added so as to provide a final concentration of 57.03 volume percent (19.53 weight percent). The PS123 crosslinker had a final concentration of 2.97 volume percent (0.98 weight percent). The zinc oxide had a final concentration of 40.0 volume percent (79.50 weight percent). The catalyst had a final concentration of 0.06 volume percent (0.02 weight percent). Results are presented in FIG. 15 and Tables 2–3.

EXAMPLE 14: 100% poly(dimethyl)siloxane, 35% zinc oxide

Figure 16A:
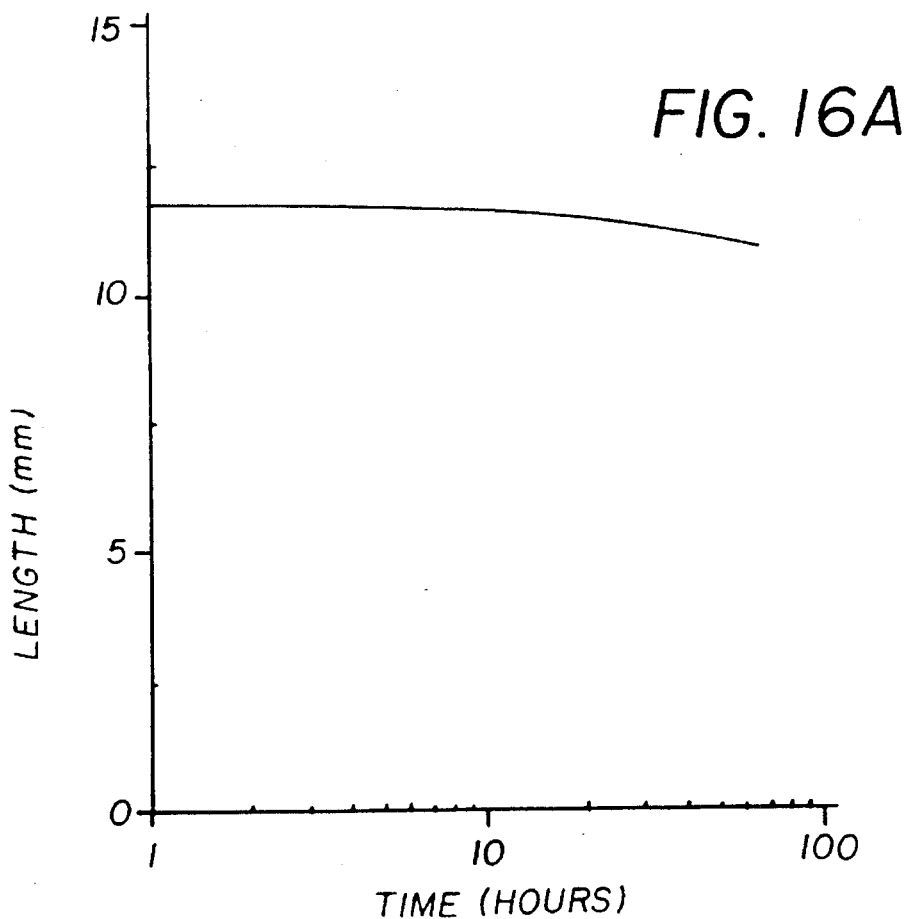
FIG. 16 is a graph of fractional length and storage modulus vs. time for the materials of Example 14.
Figure 16B:
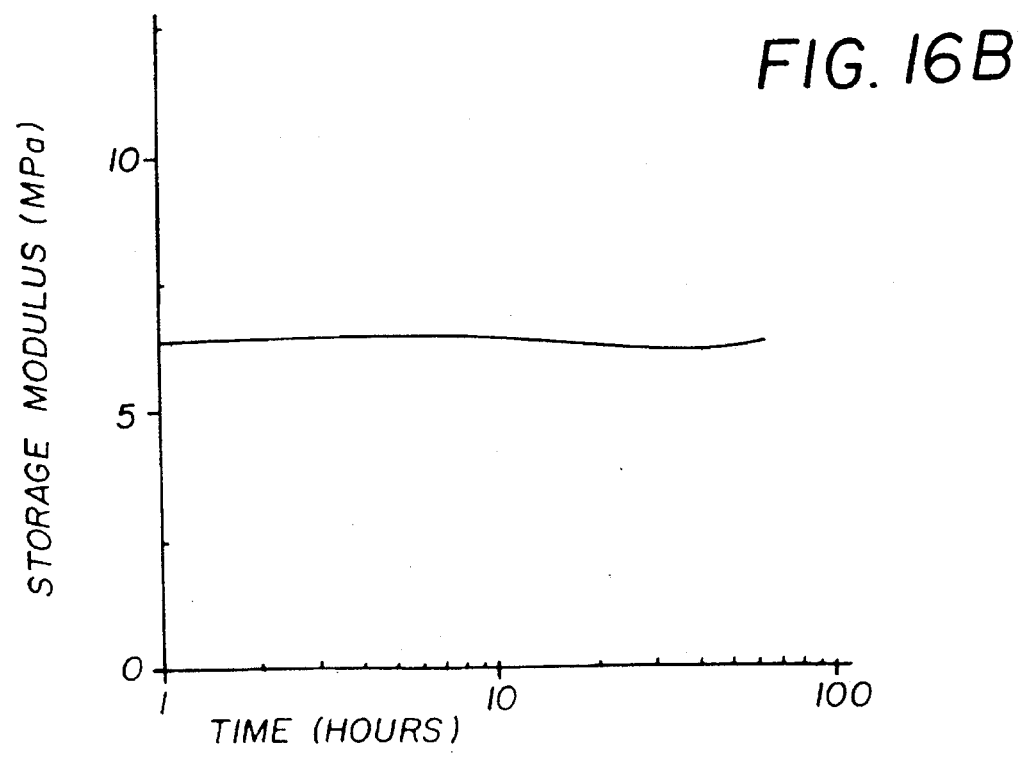

Elastomer was prepared and evaluated in substantially the same manner as in Example 13, except as follows. The siloxane used, PS442, was added so as to provide a final concentration of 61.91 volume percent (23.14 weight percent). The PS123 crosslinker had a final concentration of 3.03 volume percent (1.16 weight percent). The zinc oxide had a final concentration of 35.0 volume percent (75.68 weight percent). The catalyst had a final concentration of 0.06 volume percent (0.02 weight percent). Results are presented in FIG. 16 and in Tables 2–3.

COMPARATIVE EXAMPLE 6: 100% poly(dimethyl)siloxane, 35% aluminum oxide

Figure 17A:
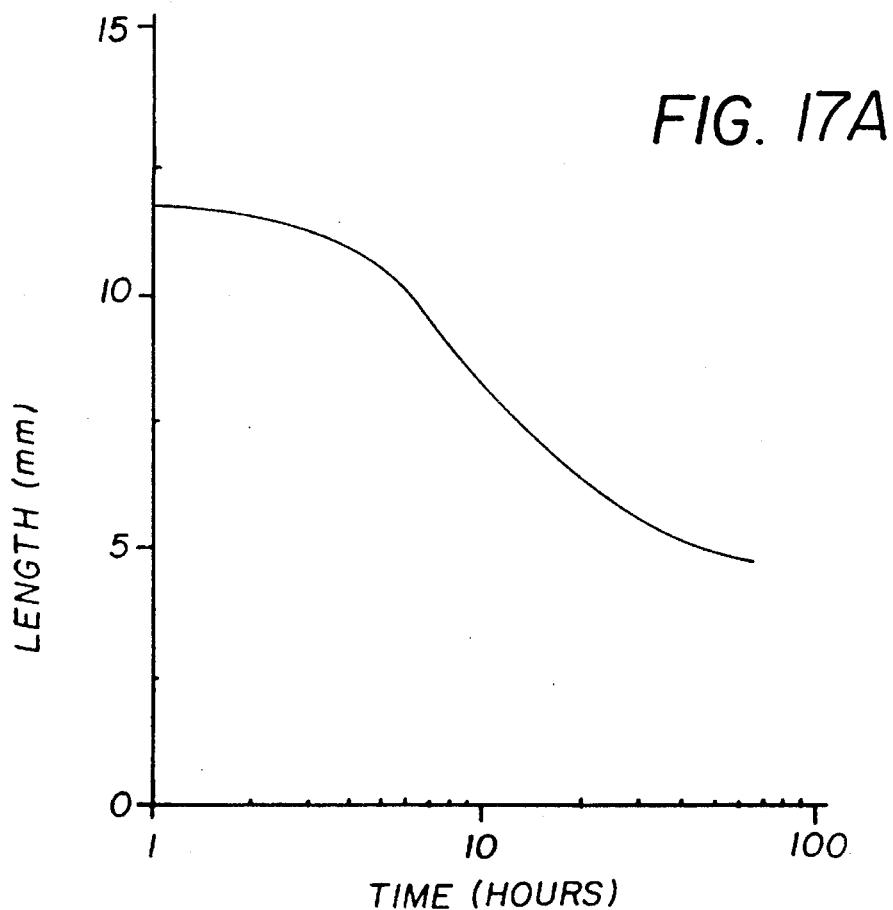
FIG. 17 is a graph of fractional length and storage modulus vs. time for the materials of Comparative Example 6.
Figure 17B:
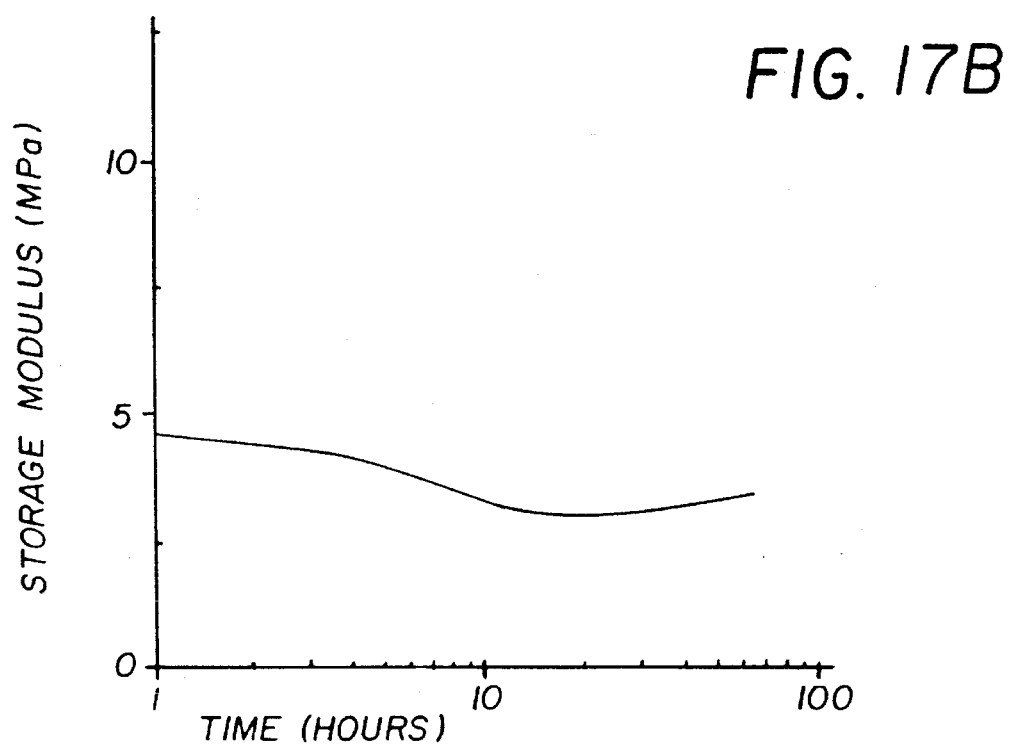

Elastomer was prepared and evaluated in substantially the same manner as in Example 14, except as follows. The siloxane used, PS442, was added so as to provide a final concentration of 61.91 volume percent (29.72 weight percent). The PS123 crosslinker had a final concentration of 3.03 volume percent (1.49 weight percent). The zinc oxide was replaced by aluminum oxide having a final concentration of 35.0 volume percent (68.77 weight percent). The catalyst contained 0.022 parts PC075 to one part PS441.2 and had a final concentration of 0.06 volume percent (0.03 weight percent). Results are presented in FIG. 17 and in Tables 2–3.

TABLE 1

Characteristics of diphenyl-dimethyl siloxanes

| Example | Polymer | Diphenyl content (mol %) | Viscosity (ctsk.) | $M_w$ |
|---|---|---|---|---|
| 1 | PS732 | 3 | 500 | 23,000 |
| 2 | PS782 | 16 | 500 | 14,100 |
| 3 | PS793 | 24 | 1000–2000 | 13,000 |
| 4 | PS784 | 16 | 5000 | 44,800 |
| 5 | PS785 | 16 | 10,000 | 68,200 |

TABLE 2a

Properties of the elastomers of the examples and comparative examples

| Ex. or C. Ex. | Thermal cond. (W/mK) | Hardness (Shore A) | MER Initial S.M. (MPa) | MER Final S.M. (MPa) | MER Chg. S.M. (%) |
|---|---|---|---|---|---|
| Ex. 1 | 0.70 | 67 | 7.22 | 7.44 | 3.13 |
| Ex. 2 | 0.79 | 63 | 6.29 | 6.28 | 0.13 |
| Ex. 3 | 0.90 | 77 | 9.29 | 10.12 | 8.97 |
| Ex. 4 | 0.86 | 61 | 4.38 | 4.13 | 5.77 |
| Ex. 5 | 0.88 | 45 | 2.61 | 3.11 | 19.05 |
| Ex. 9 | 0.56 | 50 | 3.78 | 3.60 | 4.71 |
| Ex. 10 | 0.18 | 32 | 1.66 | 1.47 | 11.90 |
| Ex. 11 | — | — | 5.26 | 4.24 | 19.40 |
| Ex. 12 | — | — | 11.62 | 10.16 | 12.52 |
| Ex. 13 | — | — | 12.11 | 11.16 | 7.89 |
| Ex. 14 | 0.78 | 47 | 6.54 | 6.15 | 5.92 |
| C. Ex. 1 | 0.64 | 56 | 4.84 | 5.10 | 5.35 |
| C. Ex. 2 | 0.71 | 62 | 4.11 | 7.00 | 70.50 |
| C. Ex. 3 | 0.85 | 57 | 4.80 | 6.27 | 30.54 |
| C. Ex. 5 | 0.76 | 35 | 2.38 | 3.83 | 61.26 |
| C. Ex. 6 | 0.69 | 62 | 4.82 | 3.47 | 27.97 |

TABLE 2b

Properties of the elastomers of the examples and comparative examples

| Example or Comparative Example | MER initial length (mm) | MER final length (mm) | MER chg. length (%) | MER weight loss (%) |
|---|---|---|---|---|
| Example 1 | 12.26 | 11.77 | 3.96 | 1.13 |
| Example 2 | 11.56 | 11.29 | 2.31 | 1.23 |
| Example 3 | 11.89 | 11.50 | 3.30 | 0.82 |
| Example 4 | 10.9 | 9.52 | 12.71 | 0.53 |
| Example 5 | 10.24 | 7.72 | 24.61 | 0.5 |
| Example 9 | 11.11 | 10.72 | 3.47 | 0.92 |
| Example 10 | 10.47 | 8.09 | 22.76 | 2.80 |
| Example 11 | 12.40 | 11.51 | 7.25 | 0.23 |
| Example 12 | 2.56 | 2.02 | 21.05 | 0.81 |
| Example 13 | 6.90 | 6.77 | 1.90 | 0.69 |
| Example 14 | 11.78 | 10.89 | 7.55 | 1.05 |
| Comp. Ex. 1 | 11.79 | 5.26 | 55.39 | 5.13 |
| Comp. Ex. 2 | 11.41 | 5.50 | 51.85 | 6.54 |
| Comp. Ex. 3 | 11.09 | 7.39 | 33.34 | 4.36 |
| Comp. Ex. 5 | 9.38 | 8.70 | 7.26 | 1.79 |
| Comp. Ex. 6 | 11.95 | 4.81 | 59.77 | 5.99 |

TABLE 3

PDMS release oil swelling results

| Example or Comparative Example | Oil swell (%) |
|---|---|
| Example 1 | 1.5 |
| Example 2 | −0.3 |
| Example 3 | −0.6 |
| Example 4 | 0.5 |
| Example 5 | −0.2 |
| Example 6 | −0.9 |
| Example 7 | −1.5 |
| Example 8 | −1.2 |
| Example 9 | −0.5 |
| Example 10 | 2.4 |
| Example 14 | 2.9 |
| Comparative Example 1 | 2.9 |
| Comparative Example 6 | 2.9 |

TABLE 4

Hardness and thermal conductivity

| Example | % diphenyl | % zinc oxide | Thermal cond. (W/mK) | Hardness (Shore A) |
|---|---|---|---|---|
| 6 | 16 | 5 | 0.26 | 11 |
| 7 | 16 | 8 | 0.27 | 8 |
| 8 | 16 | 20 | 0.36 | 18 |

Compared to the aluminum oxide-filled materials of the Comparative Examples, the zinc oxide-filled materials of the Examples showed significantly lower creep, change in storage modulus, and weight loss during the 60 hour test. In the Examples, zinc oxide concentrations of 10 volume percent or, preferably, 20 volume percent or higher provided greater stability. The oil swell was also lower in the materials of the Examples that contained diphenyl units at 3–24 mole percent compared to a pure PDMS material filled with zinc oxide or aluminum oxide. In a Comparative Example, the filler combination of zinc oxide, graphite, and cerium dioxide gave a material that was unstable in conditions of elevated temperature and cyclic stress. The hardness and thermal conductivity are comparable for the materials of the Examples and for aluminum oxide-filled materials containing identical diphenyl and filler percentages.

The invention has been described in detail with particular reference to certain preferred embodiments thereof, but it should be appreciated that variations and modifications can be effected within the spirit and scope of the invention.

What is claimed is:

1. A fuser member comprising a core and a layer overlying said core, said layer comprising: an addition crosslinked polyorganosfloxane elastomer, said layer having zinc oxide particles dispersed therein in a concentration of from 20 to 40 volume percent of the total volume of said layer, said elastomer comprises the product of addition crosslinking vinyl substituted multifunctional siloxane polymers having a weight average molecular weight between vinyl groups of from 7,000 to 100,000.

2. The fuser member of claim 1 wherein said elastomer is the product of addition crosslinking vinyl substituted multifunctional siloxane polymer and multifunctional organo-hydrosiloxane.

3. The fuser member of claim 2 wherein said vinyl substituted multifunctional siloxane polymer consists essentially of repeating units having the general structures:

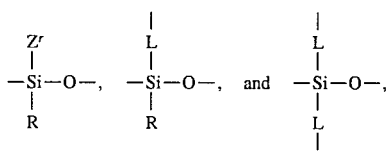

and terminal units having the general structure:

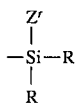

wherein

R is alkyl having from 1 to 8 carbons, or aryl having a solitary ring and from 6 to 14 carbons including carbons of any ring substituents;

$Z^r$ is alkyl having from 1 to 8 carbons, olefin having from 2 to 8 carbons and a terminal vinyl moiety, or aryl having a solitary ring and from 6 to 14 carbons including carbons of any ring substituents; and L is —O—, or —(CH$_2$)$_e$—, where e is an integer from 1 to about 8;

with the proviso that at least two $Z^r$ moieties are olefinic groups having from 2 to 8 carbons; and the proviso that less than 25 percent of said R groups are aryl.

4. The fuser member of claim 2 wherein said vinyl substituted multifunctional siloxane polymer has the general structure:

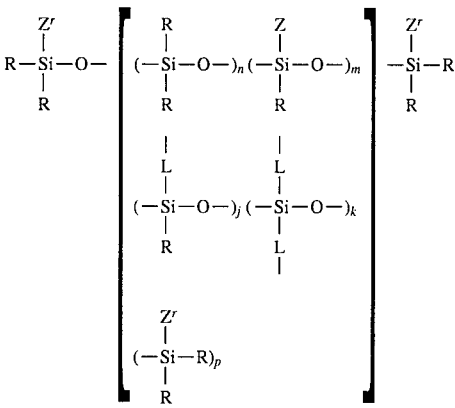

wherein

R is alkyl having from 1 to 8 carbons, or aryl having a solitary ring and from 6 to 14 carbons including carbons of any ring substituents;

Z is an olefinic group having from 2 to 8 carbons and a terminal vinyl moiety;

$Z^r$ is alkyl having from 1 to 8 carbons, olefin having from 2 to 8 carbons and a terminal vinyl moiety, or aryl having a solitary ring and from 6 to 14 carbons including carbons of any ring substituents;

L is —O—, or —(CH$_2$)$_e$—, where e is an integer from 1 to about 8;

n, m, j, k and p are integers such that the weight average molecular weight of said siloxane polymer between vinyl groups is from 7,000 to 100,000;

j+k is less than 5 percent of the total of n+m+j+k; and $$0 \leq p \leq (j+2k);$$

with the proviso that if m is 0 or 1, $Z^r$ is an olefinic group having from 2 to 8 carbons; and the proviso that less than 25 percent of said R groups are aryl.

5. The fuser member of claim 4 wherein j+k is less than about 2 percent of the total of n+m+j+k.

6. The fuser member of claim 4 wherein from about 3 to 16 percent of said R groups are phenyl and the remainder of said R groups are alkyl having from 1 to 4 carbons.

7. The fuser member of claim 4 wherein said multifunctional organo-hydrosiloxane has the general structure:

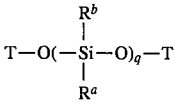

wherein

Each T represents:

or both T's together represent atoms completing an organo-hydrosiloxane ring;

$R^b$ is H or $R^a$; and

R$^a$ is alkyl having from 1 to 8 carbons, or aryl having a solitary ring and from 6 to 14 carbons including carbons of any ring substituents;

with the proviso that at least two R$^b$ moieties are H.

8. The fuser member of claim 2 wherein said multifunctional organo-hydrosiloxane has the general structure:

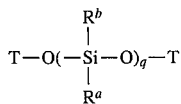

wherein

Each T represents:

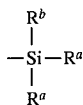

or both T's together represent atoms completing an organo-hydrosiloxane ring;

R$^b$ is H or R$^a$; and

R$^a$ is alkyl having from 1 to 8 carbons, or aryl having a solitary ring and from 6 to 14 carbons including carbons of any ring substituents;

with the proviso that at least two R$^b$ moieties are H.

9. The fuser member of claim 2 wherein said multifunctional organo-hydrosiloxane is selected from the group consisting of 1,3,5,7-tetramethylcyclotetrasiloxane; and compounds having the structural formula:

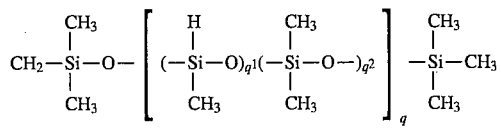

wherein q$^1$+q$^2$=q, and q is a number such that the molecular weight is from about 2,000 to 2,500.

10. The fuser member of claim 2 wherein said olefin substituted multifunctional siloxane polymer has the general structure:

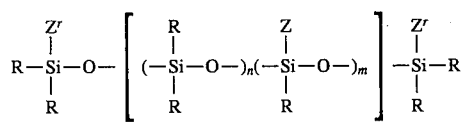

wherein

R is alkyl having from 1 to 8 carbons, or aryl having a solitary ring and from 6 to 14 carbons including carbons of any ring substituents;

Z is an olefinic group having from 2 to 8 carbons and a terminal vinyl moiety;

Z$^r$ is alkyl having from 1 to 8 carbons, olefin having from 2 to 8 carbons and a terminal vinyl moiety, or aryl having a solitary ring and from 6 to 14 carbons including carbons of any ring substituents; and n and m are integers such that the weight average molecular weight of said siloxane polymer between vinyl groups is from 7,000 to 100,000;

with the proviso that at least two of the Z and Z$^r$ groups are olefin having from 2 to 8 carbons; and the proviso that less than 25 percent of said R groups are aryl.

11. The fuser member of claim 10 wherein each Z$^r$ is an olefinic group having from 2 to 8 carbons.

12. The fuser member of claim 11 wherein m is 0.

13. The fuser member of claim 11 wherein R is methyl.

14. The fuser member of claim 10 wherein each Z$^r$ is alkyl having from 1 to 8 carbons, or aryl having a solitary ring and from 6 to 14 carbons including carbons of any ring substituents.

15. The fuser member of claim 14 wherein R is methyl.

16. The fuser member of claim 2 wherein said vinyl substituted multifunctional siloxane polymer has at least two moieties having the general structure:

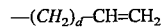

where d is an integer from 0 to about 6.

17. The fuser member of claim 16 wherein d is from 0 to 3.

18. The fuser member of claim 2 wherein said vinyl substituted multifunctional siloxane polymer is selected from the group consisting of polymers having the structural formula:

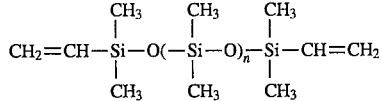

or the structural formula:

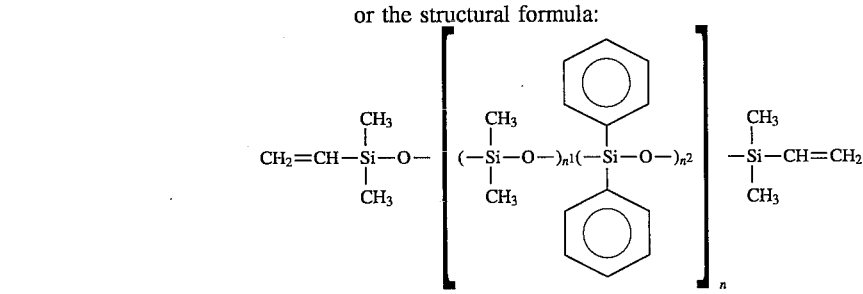

or the structural formula:

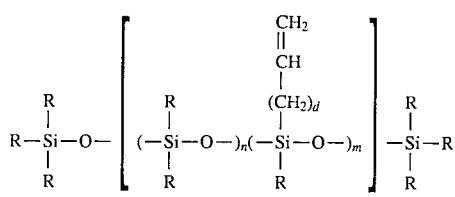

wherein, in the above formulas, d is an integer from 0 to 6;

$n^1/n^2=n$;

$n^1/n^2>3$; and n or n and m are integers such that the weight average molecular weight of said siloxane polymer between vinyl groups is from 7,000 to 100,000.

19. A fuser member comprising a core and a layer overlying said core, said layer comprising: an addition crosslinked polyorganosiloxane elastomer, said elastomer being the addition product of:

(A) vinyl substituted multifunctional siloxane polymer having the general structure:

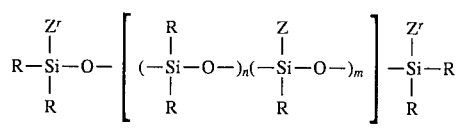

wherein

R is alkyl having from 1 to 8 carbons, or aryl having a solitary ring and from 6 to 14 carbons including carbons of any ring substituents, with the proviso that less than 25 percent of said R groups are aryl;

Z is an olefinic group having from 2 to 8 carbons and a terminal vinyl moiety;

$Z^r$ is alkyl having from 1 to 8 carbons, olefin having from 2 to 8 carbons and a terminal vinyl moiety, or aryl having a solitary ring and from 6 to 14 carbons including carbons of any ring substituents;

n and m are integers such that the weight average molecular weight of said siloxane polymer between vinyl groups is from 7,000 to 100,000, with the proviso that if m is 0, $Z^r$ is an olefinic group having from 2 to 8 carbons and a terminal vinyl moiety; and (B) multifunctional organo-hydrosiloxane having the general structure:

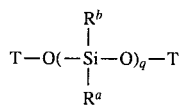

wherein

Each T represents:

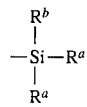

or both T's together represent atoms completing an organohydrosiloxane ring;

$R^b$ is H or $R^a$; and $R^a$ is alkyl having from 1 to 8 carbons, or aryl having a solitary ring and from 6 to 14 carbons including carbons of any ring substituents;

with the proviso that at least two $R^b$ moieties are H;

said layer further comprising zinc oxide particles dispersed therein in a concentration of from 20 to 40 percent of the total volume of said layer.

20. The fuser member of claim 19 wherein said multifunctional organo-hydrosiloxane has the general structure:

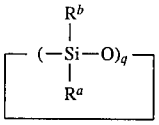

21. The fuser member of claim 19 wherein said vinyl substituted multifunctional siloxane polymer has the general structure:

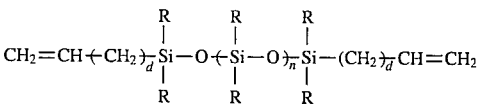

or the general structure:

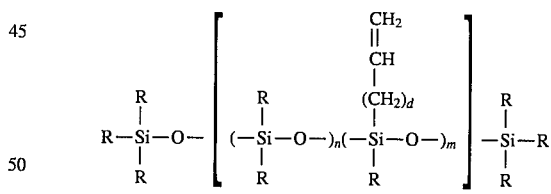

or the general structure:

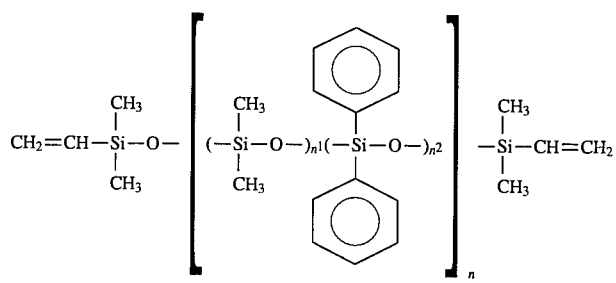

wherein $n^1+n^2=n$ and $n^1/n^2>3$.

22. A fuser member comprising a core and a layer overlying said core, said layer comprising: an addition crosslinked polyorganosiloxane elastomer, said elastomer consisting of the product of addition crosslinking vinyl substituted multifunctional polydimethylsiloxane polymers having a weight average molecular weight between vinyl groups of from 7,000 to 100,000, and multifunctional organo-hydrosiloxane having a structure:

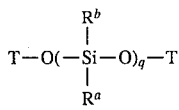

wherein
  each T represents:

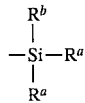

or both T's together represent atoms completing an organo-hydrosiloxane ring;
  $R^b$ is H or $R^a$; and
  $R^a$ is methyl;
  with the proviso that at least two $R^b$ moieties are H; said layer having zinc oxide particles dispersed therein in a concentration of from 20 to 40 volume percent of the total volume of said layer.

23. The fuser member of claim 22 wherein said vinyl substituted multifunctional polydimethylsiloxane polymers are selected from the group consisting of polymers having the structural formula:

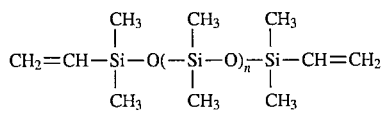

or the structural formula:

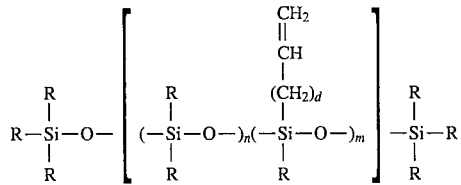

wherein, in the above formulas,
  R is methyl;
  d is an integer from 0 to 6; and
  n or n and m are integers such that the weight average molecular weight of said siloxane polymer between vinyl groups is from 7,000 to 100,000.

* * * * *